US012698458B2

(12) United States Patent
Bauer et al.

(10) Patent No.: US 12,698,458 B2
(45) Date of Patent: Aug. 4, 2026

(54) WASHING AND CLEANING AGENTS COMPRISING ENVIRONMENTALLY COMPATIBLE MICROCAPSULES

(71) Applicant: Henkel AG & Co. KGaA, Duesseldorf (DE)

(72) Inventors: Andreas Bauer, Kaarst (DE); Anneliese Wilsch-Irrgang, Duesseldorf (DE); Stefan Urlichs, Essen (DE); Christian Kind, Baden-Baden (DE); Jeanette Hildebrand, Buehl (DE); Klaus Last, Braunschweig (DE); Claudia Meier, Lichtenau (DE)

(73) Assignee: Henkel AG & Co. KGaA, Düsseldorf (DE)

( * ) Notice: Subject to any disclaimer, the term of this patent is extended or adjusted under 35 U.S.C. 154(b) by 591 days.

(21) Appl. No.: 17/781,422

(22) PCT Filed: Dec. 11, 2020

(86) PCT No.: PCT/EP2020/085679
§ 371 (c)(1),
(2) Date: Jun. 1, 2022

(87) PCT Pub. No.: WO2021/116365
PCT Pub. Date: Jun. 17, 2021

(65) Prior Publication Data

US 2023/0021818 A1 Jan. 26, 2023

(30) Foreign Application Priority Data

Dec. 12, 2019 (WO) ................. PCT/EP2019/084841

(51) Int. Cl.

| | |
|---|---|
| ***C11D 3/50*** | (2006.01) |
| ***C11D 1/82*** | (2006.01) |
| ***C11D 3/12*** | (2006.01) |
| ***C11D 3/30*** | (2006.01) |
| ***C11D 3/37*** | (2006.01) |
| ***C11D 17/00*** | (2006.01) |

(52) U.S. Cl.
CPC ................ *C11D 3/505* (2013.01); *C11D 1/82* (2013.01); *C11D 3/1233* (2013.01); *C11D 3/30* (2013.01); *C11D 3/3753* (2013.01)

(58) Field of Classification Search
None
See application file for complete search history.

(56) References Cited

U.S. PATENT DOCUMENTS

| | | | | |
|---|---|---|---|---|
| 2,800,457 | A | 7/1957 | Green et al. | |
| 2003/0004226 | A1 | 1/2003 | Hoffman et al. | |
| 2013/0137626 | A1 | 5/2013 | Last et al. | |
| 2014/0193350 | A1 | 7/2014 | Bauer et al. | |
| 2015/0210965 | A1 | 7/2015 | Bertram et al. | |
| 2016/0347704 | A1 | 12/2016 | Kropf et al. | |
| 2019/0321279 | A1 | 10/2019 | Lei et al. | |
| 2019/0358603 | A1 | 11/2019 | Jurisch et al. | |
| 2020/0330950 | A1 * | 10/2020 | Cardoso .................. | A61K 8/26 |
| 2022/0175635 | A1 * | 6/2022 | Van Gruijthuijsen ... | B01J 13/14 |
| 2023/0028683 | A1 * | 1/2023 | Kind ........................ | A61K 8/65 |

FOREIGN PATENT DOCUMENTS

| | | | |
|---|---|---|---|
| DE | 3424115 | A1 | 1/1986 |
| EP | 1246693 | B1 | 4/2004 |
| EP | 2638139 | | 5/2012 |
| EP | 2689835 | A1 | 1/2014 |
| EP | 3110393 | | 8/2015 |
| GB | 1257178 | A | 12/1971 |
| KR | 1020040094930 | A | 11/2004 |
| WO | 2007075207 | A1 | 7/2007 |
| WO | 2009126742 | A2 | 10/2009 |
| WO | 2010003762 | A1 | 1/2010 |
| WO | 2010079466 | A2 | 7/2010 |
| WO | 2011075425 | A1 | 6/2011 |
| WO | 2011/110368 | A2 | 9/2011 |
| WO | 2011120772 | A1 | 10/2011 |
| WO | 2013037575 | A1 | 3/2013 |
| WO | 2014016395 | A1 | 1/2014 |
| WO | 2014032920 | A1 | 3/2014 |
| WO | 2014036082 | A2 | 3/2014 |
| WO | 2014044840 | A1 | 3/2014 |
| WO | 2015014628 | A1 | 2/2015 |
| WO | 2017108722 | A1 | 6/2017 |
| WO | 2017143174 | A1 | 8/2017 |
| WO | 2018114056 | A1 | 6/2018 |
| WO | WO-2019145731 | A1 * | 8/2019 |

OTHER PUBLICATIONS

KR 20040094930-A, English abstract. (Year: 2004).*
WO 2008/006762-A2, Hentze et al. (with English Translation), published on Jan. 17, 2008.*
JP 2004115652 (Year: 2004).*
Bender et al. "The Determination of the Concentration of Hydrolytic Enzyme Solutions . . . ", Journal of the American Chemical Society, 1966, pp. 5890-5913, 88:24.
International search report of parallel PCT-application PCT/EP2019/084841 dated Aug. 3, 2020, 6 pages, for information purpose only.
International search report of parallel PCT-application PCT/EP2020/085679 dated Feb. 26, 2021, 6 pages, for information purpose only.

* cited by examiner

*Primary Examiner* — Lorna M Douyon
(74) *Attorney, Agent, or Firm* — Blank Rome LLP

(57) ABSTRACT

Washing and cleaning agents may include microcapsules comprising a core material where the core material may include at least one fragrance and a shell. The shell may consist of at least one first layer and one second layer with different chemical compositions. The shell may have a biodegradability, measured in accordance with OECD 301 F, of at least 40%. Such agents may be used for conditioning textiles or for cleaning textiles and/or hard surfaces.

19 Claims, 8 Drawing Sheets

WASHING AND CLEANING AGENTS COMPRISING ENVIRONMENTALLY COMPATIBLE MICROCAPSULES

CROSS-REFERENCE TO RELATED APPLICATION

The present application is a national stage entry according to 35 U.S.C. § 371 of PCT application No.: PCT/EP2020/085679 filed on Dec. 11, 2020; which claims priority to PCT patent application PCT/EP2019/084841, filed on Dec. 12, 2019; all of are incorporated herein by reference in their entirety and for all purposes.

TECHNICAL FIELD

The disclosure relates to washing and cleaning agents comprising stable microcapsules with environmentally compatible wall materials.

BACKGROUND

Microencapsulation is a versatile usable technology. It offers solutions for numerous innovations—from the paper industry to household products, microencapsulation increases the functionality of a wide variety of active substances. Encapsulated active ingredients can be used more economically and improve the sustainability and environmental compatibility of many products. However, the polymeric wall materials of the microcapsules themselves are environmentally compatible to very different degrees. Microcapsule walls based on the natural product gelatin and therefore completely biodegradable have long been used in carbonless copy paper. A method for gelatin encapsulation that was developed as early as the 1950s is disclosed in U.S. Pat. No. 2,800,457. Since then, a multitude of variations in terms of materials and method steps have been reported. In addition, biodegradable or enzymatically degradable microcapsule walls are used in order to use enzymatic degradation as a method for releasing the core material. Such microcapsules are described, for example, in WO 2009/126742 A1 or WO 2015/014628 A1.

However, such microcapsules are not suitable for many industrial applications and household products. This is because microcapsules based on natural substances do not meet the diffusion tightness, chemical resistance and temperature resistance required for washing and cleaning agents, adhesive systems, paints and dispersions, nor the required loading with core material. In these so-called high-demand areas, traditional organic polymers such as melamine-formaldehyde polymers (see, for example, EP 2 689 835 A1, WO 2018/114056 A1, WO 2014/016395 A1, WO 2011/075425 A1 or WO 2011/120772 A1); polyacrylates (see, for example, WO 2014/032920 A1, WO 2010/79466 A2); polyamides; polyurethane or polyureas (see, for example, WO 2014/036082 A2 or WO 2017/143174 A1) are used. The capsules made from such organic polymers have the required diffusion tightness, stability and chemical resistance. However, these organic polymers are enzymatically or biologically degradable only to a very small extent.

Various approaches have been described in the prior art in which biopolymers are combined as an additional component with the organic polymers of the microcapsule shell for use in high-demand areas, but not with the aim of preparing biodegradable microcapsules, but to modify primarily the release, stability or surface properties of the microcapsules. For example, WO 2014/044840 A1 describes a method for preparing two-layer microcapsules with an inner polyurea layer and an outer layer containing gelatin. The polyurea layer is produced by polyaddition on the inside of the gelatin layer obtained by coacervation. According to the description, the capsules obtained in this way have the necessary stability and tightness for use in washing and cleaning agents due to the polyurea layer and, in addition, due to the gelatin they are sticky so that they can be attached to surfaces. Concrete stability and resistance are not mentioned. A disadvantage of polyurea capsules, however, is the unavoidable side reaction of the core materials with the diisocyanates used to produce the urea, which must be admixed to the oil-based core.

On the other hand, microcapsules based on biopolymers are also described in the prior art, which, by adding a protective layer, achieve improved tightness or stability with respect to environmental influences or a targeted setting of a delayed release behavior. For example, WO 2010/003762 A1 describes particles with a core-shell-shell structure. The core of each particle is a poorly water-soluble or water-insoluble organic substance. The shell directly encasing the core contains a biodegradable polymer and the outer shell contains at least one metal or semimetal oxide. With this structure, a biodegradable shell is obtained. According to WO 2010/003762 A1, the microcapsules are nevertheless used in foods, cosmetics or pharmaceuticals, but cannot be used for the high-demand areas due to a lack of tightness.

SUMMARY

Microcapsules can be produced which are essentially biodegradable and nevertheless have sufficient stability and tightness to be able to be used in washing and cleaning agents due to a multilayer structure of shells. This is achieved in that a first layer that imparts stability and structure makes up the main part of the capsule shell, which consists of naturally occurring and easily biodegradable materials such as gelatin or alginate or of materials that are ubiquitously present in nature. This first layer is combined with a second impervious layer, which can consist of known materials used for microencapsulation, such as melamine-formaldehyde or meth(acrylate). The second layer can be arranged both on the outside of the first layer and on the inside of the first layer. The second layer is preferably arranged on the inside of the first layer. The inventors have succeeded in designing the impermeability-imparting second layer with a wall thickness that has not previously been imaginable and yet in ensuring adequate tightness, as shown in Example 5. The proportion of the total wall is thus kept very low, so that the microcapsule wall has a biodegradability measured according to OECD 301 F of at least 40%, as shown in Examples 6 and 7.

Thus, according to a first aspect, washing and cleaning agents may include:

a) microcapsules comprising a core material, the core material comprising at least one fragrance, and a shell, the shell consisting of at least one first layer and one second layer, the chemical compositions of which differ from one another, and wherein the shell having a biodegradability, measured in accordance with OECD 301 F, of at least 40%; and, optionally, b) at least one other ingredient selected from surfactants, builders, enzymes and agents that enhance absorption.

Furthermore, in a further aspect, washing and cleaning agents may be used in a method for conditioning textiles or for cleaning textiles and/or hard surfaces.

DETAILED DESCRIPTION

Definitions

Figure 1:
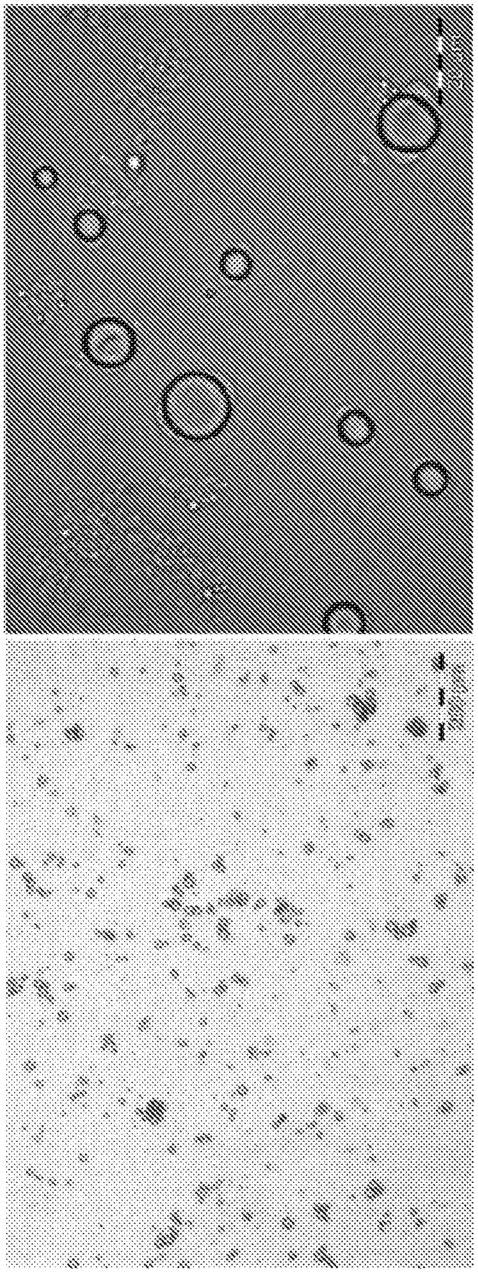
FIG. 1 is a photomicrograph of the capsules MK 1 used magnified 50 times and 500 times, taken with an Olympus BX 50 microscope.

"Biodegradability" refers to the ability of organic chemicals to be broken down biologically, i.e., by living beings or their enzymes. In the ideal case, this chemical metabolism proceeds completely up to the point of mineralization, but it can also stop in the case of transformation products that are stable in degradation. The guidelines for the testing of chemicals from the OECD, which are also used in the context of chemical approval, are generally recognized. The tests of the OECD test series 301 (A-F) indicate rapid and complete biodegradation under aerobic conditions. Different test methods are available for readily or poorly soluble as well as for volatile substances. In particular, the nanometric respiration test (OECD 301 F) is used within the scope of the application. The basic biological degradability (inherent biodegradability) can be determined using the measurement standard OECD 302, for example the MITI-II test (OECD 302 C).

"Biodegradable" or "biologically degradable" refers to microcapsule walls that have a biodegradability measured according to OECD 301 F of at least 40% or measured according to OECD 302 C (MITI-II test) of at least 20% and thus have an inherent one or fundamental degradability. This corresponds to the limit value for the OECD 302 C according to "Revised Introduction to the OECD Guidelines for testing of Chemicals, Section 3, Part 1, dated 23 Mar. 2006". From a limit value of at least 60% measured according to OECD 301 F, microcapsule walls are also referred to as rapidly biodegradable.

"Tightness" against a substance, gas, liquid, radiation or similar is a property of material structures. The terms "imperviousness" and "tightness" are used synonymously. Tightness is a relative term and always refers to given framework conditions.

The term "(meth)acrylate" designates both methacrylates and acrylates.

The term "microcapsules" is understood as meaning particles containing an inner space or core which is filled with a solid, gelled, liquid or gaseous medium and surrounded (encapsulated) by a continuous cover (shell) of film-forming polymers. These particles preferably have small dimensions. The terms "microcapsules", "core-shell capsules" or simply "capsules" are used interchangeably.

"Microencapsulation" is a preparation process in which small and very small portions of solid, liquid or gaseous substances are surrounded by a cover made of polymer or inorganic wall materials. The microcapsules obtained in this way can have a diameter of a few millimeters to less than 1 μm.

The microcapsule thus has a multilayer shell. The shell encasing the core material of the microcapsule is also regularly referred to as "wall" or "shell".

The microcapsules with a multilayer shell can also be referred to as multilayer microcapsules or multilayer microcapsule system, since the individual layers can also be regarded as individual shells. "Multi-layered" and "having multiple shells" are therefore used synonymously.

"Wall formers" are the components that make up the microcapsule wall.

Microcapsules

The microcapsules used in the washing and cleaning agents according to a first aspect comprise a core material and a shell, the shell consisting of at least a first and a second layer whose chemical compositions differ and the shell having biodegradability measured according to OECD 301 F of at least 40%. Measured according to OECD 302 C, the microcapsules have a biodegradability of at least 20%.

As shown in Examples 6 and 7, the microcapsule shells are biodegradable according to the OECD due to the high proportion of natural components.

According to one embodiment, the first layer of the microcapsules contains one or more biodegradable components as wall formers. This first layer forms the main stability-giving component of the microcapsule shell and thus ensures high biodegradability according to OECD 301 F of at least 40%. Biodegradable components suitable as wall formers for the first layer are proteins such as gelatin; polysaccharides such as alginate, gum arabic, chitin, or starch; phenolic macromolecules such as lignin; polyglucosamines such as chitosan, polyvinyl esters such as polyvinyl acetate and polyvinyl alcohols, in particular highly hydrolyzed and fully hydrolyzed polyvinyl alcohols; phosphazenes and polyesters such as polylactide or polyhydroxyalkanoate. This enumeration of the specific components in the individual substance classes is only an example and should not be understood as limiting. Suitable natural wall formers are known to the person skilled in the art. Furthermore, the various methods for wall formation, for example coacervation or interfacial polymerization, are known to the person skilled in the art.

These biodegradable components can be selected appropriately for the respective application in order to form a stable multi-layer shell with the material of the second layer.

The second layer can be arranged both on the outside of the first layer and on the inside of the first layer. The second layer is preferably arranged on the inside of the first layer. In addition, the biodegradable components can be selected in order, for example, to ensure compatibility with the core material if arranged on the inside, or to achieve compatibility with the chemical conditions of the application area if arranged on the outside. The biodegradable components can be combined in any way in order to influence the biodegradability or, for example, the stability and chemical resistance of the microcapsule.

In one embodiment of the first aspect, the shell of the microcapsules has a biodegradability of 50% according to OECD 301 F. In a further embodiment, the shell of the microcapsule has a biodegradability of at least 60% (OECD 301 F). In another embodiment, the biodegradability is at least 70% (OECD 301 F). According to OECD 5 302 C, the microcapsule can have a biodegradability of at least 25%. According to one embodiment, the biodegradability is at least 30% (OECD 302 C). According to a further embodiment, the biodegradability is at least 40% (OECD 302 C). The biodegradability is measured over a period of 28 days. In the extended degradation process ("enhanced ready biodegredation"), the biodegradability is measured over a period of 60 days (see Opinion on an Annex XV dossier proposing restrictions on intentionally-added microplastics of Jun. 11, 2020 ECHA/RAC/RES-O-0000006790-71-01/F). Before determining the biodegradability, the microcapsules are preferably freed from dissolved residues by washing. In one embodiment, the capsule dispersion is washed after preparation by centrifuging three times and redispersing in water. For this, the sample is centrifuged. After sucking off the clear supernatant, it is filled up with water and the sediment is redispersed by shaking. Various reference samples can be used to measure biodegradability, such as rapidly degradable ethylene glycol or natural walnut shell flour with the typical gradual degradation of a complex mixture of substances. The microcapsule shows a similar, preferably better, biodegradability over a period of 28 or 60 days than the walnut shell flour.

A high level of biodegradability is achieved on the one hand by the wall formers used and on the other hand by the structure of the shell. Because the use of a certain percentage of natural potentially biodegradable components does not automatically lead to a corresponding value of biodegradability. This depends on how the potentially biodegradable components are present in the shell.

According to a preferred embodiment, the first layer contains gelatin. According to a further preferred embodiment, the first layer contains alginate. According to a further preferred embodiment, the first layer contains gelatin and alginate. As shown in the embodiment, both gelatin and alginate are suitable for the preparation of microcapsules with high biodegradability and high stability. Other suitable combinations of natural components in the first layer are gelatin and gum arabic.

According to one embodiment, the first layer contains one or more curing agents. Curing agents are aldehydes such as glutaraldehyde, glyoxal and formaldehyde, as well as tannins, enzymes such as transglutaminase and organic anhydrides such as maleic anhydride. Preferably the curing agent is glutaraldehyde due to its very good crosslinking properties. Furthermore, the curing agent glyoxal is preferred because of its good crosslinking properties and, compared to glutaraldehyde, lower toxicological classification. Through the use of curing agents, a higher tightness of the first layer consisting of natural murals is achieved. In addition, the curing agents reduce the stickiness of the layer and thus the tendency to agglomerate. However, curing agents lead to reduced biodegradability of the natural polymers. Due to the combination of the first layer with the second layer as a diffusion barrier, the amount of curing agent in the first layer can be kept low, which in turn contributes to the easy biodegradability of the layer. According to one embodiment, the proportion of the curing agent in the first layer is less than 25 wt. %.

Unless explicitly defined otherwise, the proportions of the components of the layers relate to the total weight of the layer, i.e., the total dry weight of the components used for the preparation, without taking into account the components used in the preparation that are not or only slightly incorporated into the layer, such as surfactants and protective colloids. Above this value, the biodegradability according to OECD 301 F cannot be guaranteed. The proportion of the curing agent in the first layer is preferably in the range of 5-15 wt. %. This proportion leads to effective crosslinking of the gelatin and, in a quantitative reaction, results in as little residual monomer as possible being formed. The range of 9 wt. % to 12 wt. % is particularly preferred, it produces the required degree of cross-linking and a stable covering of the second shell for buffering the otherwise sensitive diffusion barrier and to equip it with further barrier properties and it has only few residual aldehyde that is degraded in a downstream alkaline adjustment of the slurry via an aldol reaction.

In one embodiment, the first layer contains gelatin and glutaraldehyde. According to a further embodiment, the first layer contains gelatin, alginate and glutaraldehyde. In an additional embodiment, the first layer contains gelatin and glyoxal. According to another embodiment, the first layer contains gelatin, alginate and glyoxal. The exact chemical composition of the first layer is not critical. It only has to ensure sufficient stability of the microcapsule wall and the release behavior required for the respective application. It is essential that it has only small amounts or preferably no unnatural persistent components. Consequently, the first layer can also contain one or more inorganic components as wall formers as an alternative or in addition to the biodegradable components. Inorganic components as wall formers can be, in particular, calcium carbonates or polysilicates. These are particularly suitable because, as ubiquitous components, they are environmentally compatible. Since there is no need to degrade these inorganic components, they are regarded as completely biodegradable, even if the criteria according to OECD 301 or OECD 302 are not applicable to these components.

The second layer is also referred to as a sealing layer or diffusion barrier. Despite the thin walls of the second layer, the microcapsules are very tight. As shown in example 5, the tightness is sufficient for use in a high-demand area. According to one embodiment, the second layer has an average thickness in the range from 0.01 μm to 1 μm. A layer thickness greater than 1 μm would increase the proportion of the components of the second layer in the total capsule wall too much and thus no longer ensure adequate biodegradability. With a layer thickness of less than 0.01 μm, the second layer would no longer be an adequate diffusion barrier. Thus, the microcapsules would be unsuitable for the high-demand areas. With a layer thickness of 0.02 μm or more, the second layer has sufficient impermeability for most areas of application. For easy biodegradability of the microcapsule, the wall thickness of the second layer should be no more than 0.5 μm. The wall thickness of the second layer is particularly preferably in the range from 0.05 μm to 0.30 μm. In this range, an optimal density is achieved with easy biodegradability.

The second layer preferably contains, as a wall former, one or more components selected from the group consisting of an aldehyde component, an aromatic alcohol, an amine component, an acrylate component. Preparation processes for preparing microcapsules with these wall materials are known to the person skilled in the art. A polymer selected from a polycondensation product of an aldehyde component with one or more aromatic alcohols and/or amine components can be used to prepare the second layer.

As shown in embodiments 1 and 4, the thin wall thickness of the second layer can be achieved in particular with a melamine-formaldehyde layer containing aromatic alcohols or m-aminophenol. Accordingly, the second layer preferably comprises an aldehyde component, an amine component and an aromatic alcohol.

The use of amine-aldehyde compounds in the second layer, in particular melamine-formaldehyde, has the advantage that these compounds form a hydrophilic surface with a high proportion of hydroxy functionality, which thus has excellent compatibility with the components of the first layer that are aligned towards hydrogen bonds, such as biodegradable proteins, polysaccharides, chitosan, lignins and phosphazenes but also inorganic wall materials such as $CaCO_3$ and polysiloxanes. Likewise, polyacrylates, in particular from the components styrene, vinyl compounds, methyl methacrylate, and 1,4-butanediol acrylate, methacrylic acid, by initiation, for example, with t-butyl hydroperoxide in a radically induced polymerization (polyacrylates) can be produced as a microcapsule wall that forms a hydrophilic surface with a high proportion of hydroxy functionality, which are therefore just as compatible with the components of the first layer.

In a preferred embodiment, a wall former of the second layer is therefore an aldehyde component. According to one embodiment, the aldehyde component of the second layer is selected from the group consisting of formaldehyde, glutaraldehyde, succinaldehyde, furfural, and glyoxal. Microcapsules have already been successfully produced with these aldehydes (see WO 2013 037 575 A1), so it can be assumed that capsules with a similar density as with formaldehyde are obtained with them.

Based on the investigations, the proportion of the aldehyde component for wall formation based on the total weight of the second shell should be in the range of 5 to 50 wt. %. Outside these limits, it is considered that a sufficiently stable and dense thin film cannot be obtained. The concentration of the aldehyde component in the second layer is preferably in the range from 10 to 30 wt. %. The concentration of the aldehyde component in the second layer is particularly preferably in the range from 15 to 20 wt. %.

In particular, melamine, melamine derivatives and urea or combinations thereof come into consideration as the amine component in the second layer. Suitable melamine derivatives are etherified melamine derivatives and methylolated melamine derivatives. Melamine in the methylolated form is preferred. The amine components can be used, for example, in the form of alkylated mono- and polymethylol-urea precondensates or partially methylolated mono- and polymethylol-1,3,5-triamono-2,4,6-triazine precondensates such as Luracoll SD® (from BASF). According to one embodiment, the amine component is melamine. According to an alternative embodiment, the amine component is a combination of melamine and urea.

The aldehyde component and the amine component can be present in a molar ratio ranging from 1:5 to 3:1. For example, the molar ratio may be 1:5, 1:4.5, 1:4, 1:3.5, 1:3, 1:2.5, 1:2, 1:1.8, 1:1.6, 1:1.4, 1; 1.3, 1:1.2, 1:1, 1.5:1, 2:1, 2.5:1, or 3:1. The molar ratio is preferably in the range from 1:3 to 2:1. The molar ratio of the aldehyde component and the amine component can particularly preferably be in the range from 1:2 to 1:1. The aldehyde component and the amine component are generally used in a ratio of about 1:1.3. This molar ratio allows a complete reaction of the two reactants and leads to a high tightness of the capsules. For example, aldehyde-amine capsule walls with a molar ratio of 1:2 are also known. These capsules have the advantage that the proportion of the highly crosslinking aldehyde, in particular formaldehyde, is very low. However, these capsules have a lower tightness than the capsules with a ratio of 1:1.3. Capsules with a ratio of 2:1 have an increased tightness, but have the disadvantage that the aldehyde component is partly unreacted in the capsule wall and the slurry.

In one embodiment, the proportion of the amine components (e.g. melamine and/or urea) in the second layer is in the range from 20 wt. % to 85 wt. %, based on the total weight of the second layer. For example, the proportion of the amine component can be 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. % or 85 wt. %. In a preferred embodiment, the proportion of the amine component in the second layer is in the range from 40 wt. % to 80 wt. %, based on the total weight of the second layer. The proportion of the amine component is particularly preferably in the range from 55 wt. % to 70 wt. %.

With the aromatic alcohol, it is possible to greatly reduce the wall thickness of the second layer made up of the amine component and the aldehyde component in order to still obtain a layer that has the necessary tightness and is stable enough, at least in combination with the first layer. The aromatic alcohols give the wall increased tightness, since their highly hydrophobic aromatic structure makes it difficult for low-molecular substances to diffuse through. As shown in the examples, particularly suitable aromatic alcohols are phloroglucinol, resorcinol or m-aminophenol. Thus, in one embodiment, the aromatic alcohol is selected from the group consisting of phloroglucinol, resorcinol and aminophenol. In combination with the amine and aldehyde components, the aromatic alcohol is used in a molar ratio to the aldehyde component in the range of (alcohol:aldehyde) 1:1 to 1:20, preferably in the range from 1:2 to 1:10.

In one embodiment, the proportion of the aromatic alcohol in the second layer is in the range of 1.0 wt. % to 20 wt. % based on the total weight of the second layer. For example, the proportion of the aromatic alcohol may be 1.5 wt. %, 2.0 wt. %, 2.5 wt. %, 3.0 wt. %, 4.0 wt. %, 5.0 wt. %, 6 wt. %, 7 wt. %, 8 wt. %, 9 wt. %, 10 wt. %, 11 wt. %, 12 wt. %, 13 wt. %, 14 wt. %, 15 wt. %, 16 wt. %, 17 wt. %, 18 wt. %, 19 wt. % or 20 wt. %. Due to their aromatic structure, the aromatic alcohols give the capsule wall a color that increases with the proportion of aromatic alcohol. Such coloring is undesirable in a number of applications. In addition, the aromatic alcohols are susceptible to oxidation, which leads to a change in color over time. As a result, the undesired coloration of the microcapsules can hardly be compensated for with a dye. For this reason, the aromatic alcohols should not be used above 20.0 wt. %. Below 1.0 wt. %, no effect on the tightness can be detected. In a preferred embodiment, the proportion of the aromatic alcohol in the second layer is in the range from 5.0 to 15.0 wt. %, based on the total weight of the second layer. Up to a percentage of 15.0 wt. %, coloration is tolerable in most applications. In a particularly preferred embodiment, the proportion of the aromatic alcohol in the second layer, based on the total weight of the second layer, is in the range from 7.0 to 13.0 wt. %. In particular, the content of the aromatic alcohol in the second layer is in the range of 9.0 wt. % to 13.0 wt. %.

In a further embodiment, the aldehyde component of the second layer can be used together with an aromatic alcohol such as resorcinol, phloroglucinol or m-aminophenol as the wall-forming component(s), i.e., without the amine component(s).

In one embodiment, the second layer of the microcapsules contains melamine, formaldehyde and resorcinol. In one embodiment, the second layer of the microcapsules contains melamine, urea, formaldehyde and resorcinol. In a preferred embodiment, the second layer of the microcapsules contains melamine in the range from 25 to 40 wt. %, formaldehyde in the range from 15 to 20 wt. % and resorcinol in the range from 0.1 to 12 wt. % and optionally urea in the range 15 to 20 wt. %. The proportions relate to the amounts used to form the wall of the layer and are based on the total weight of the second layer without protective colloid.

A protective colloid can also be used to prepare the second layer from an aldehyde component, an amine component and an aromatic alcohol. A suitable protective colloid is 2-acrylamido-2-methylpropanesulfonic acid (AMPS, commercially available as Lupasol®PA 140, BASF) or salts thereof. The proportion of the protective colloid in the components used to prepare the second layer can be in the range from 10 to 30 wt. %, based on the total dry weight of the components used. According to one embodiment, the proportion of the protective colloid in the components used to prepare the second layer is in the range from 15 to 25 wt. %. A certain low percentage of the protective colloid can also be contained in the finished microcapsule shell. Determining the proportion of protective colloid in the second layer is technically difficult. In addition, the proportion is small. Consequently, the other proportions of the other ingredients are presented as if the protective colloid were not included.

The (meth)acrylate polymers optionally used for forming the thin second layer (diffusion barrier) can be homo- or copolymers of methacrylate monomers and/or acrylate monomers. The (meth)acrylate polymers are, for example, homo- or copolymers, preferably copolymers, of one or more polar functionalized (meth)acrylate monomers, such as those (meth)acrylate monomers containing sulfonic acid groups, carboxylic acid groups, phosphoric acid groups, nitrile groups, phosphonic acid, ammonium groups, amine groups or nitrate groups. The polar groups can also be present in salt form. (Meth)acrylate copolymers can consist, for example, of two or more (meth)acrylate monomers (e.g. acrylate+2-acrylamido-2-methylpropanesulfonic acid) or of one or more (meth)acrylate monomers and one or more monomers (e.g. methacrylate+styrene) different from (meth) acrylate monomers.

Examples of (meth)acrylate polymers are homopolymers of (meth)acrylates containing sulfonic acid groups (e.g. 2-acrylamido-2-methylpropanesulfonic acid or its salts (AMPS), or their copolymers, copolymers of acrylamide and (meth)acrylic acid, copolymers of alkyl (meth)acrylates and N-vinylpyrrolidone (commercially available as Luviskol® K15, K30 or K90, BASF), copolymers of (meth)acrylates with polycarboxylates or polystyrene sulfonates, copolymers of (meth)acrylates with vinyl ethers and/or maleic anhydride, copolymers of (meth)acrylates with ethylene and/or maleic anhydride, copolymers of (meth)acrylates with isobutylene and/or maleic anhydride, or copolymers of (meth)acrylates with styrene-maleic anhydride.

Preferred (meth)acrylate polymers are homo- or copolymers, preferably copolymers, of 2-acrylamido-2-methylpropanesulfonic acid or its salts (AMPS). Copolymers of 2-acrylamido-2-methylpropanesulfonic acid or its salts are preferred, for example copolymers with one or more comonomers from the group of (meth)acrylates, vinyl compounds such as vinyl esters or styrenes, unsaturated di- or polycarboxylic acids such as maleic esters, or the salts of amyl compounds or allyl compounds.

In contrast to known biodegradable microcapsules, the microcapsules are very tight. According to one embodiment, the microcapsules are tight enough to ensure that at most 80 wt. % of the core material used escapes after storage for a period of 12 weeks at a temperature of 0 to 40° C.

In addition to the shell material, the tightness also depends on the type of core material. The tightness of the microcapsules was determined for the fragrance oil Weiroclean from Kitzing, since the chemical properties of this fragrance oil are representative of microencapsulated fragrance oils. Weiroclean has the following components (with proportion based on the total weight):

| | |
|---|---|
| 1-(1,2,3,4,5,6,7,8-octahydro-2,3,8,8-tetramethyl-2-naphthalenyl)ethanone | 25-50% |
| 2-hydroxy-benzoic acid 2-hexyl ester | 10-25% |
| phenylmethylbenzoic acid | 5-10% |
| 3-methyl-4-(2,6,6-trimethyl-2-cyclohexenyl)-3-buten-2-one | 1-5% |
| 3,7-dimethyl-6-octen-1-ol | 1-5% |
| 3-methyl-5-phenylpentanol | 1-5% |
| 2,6-dimethyloct-7-en-2-ol | 1-5% |
| 4-(2,6,6-trimethylcyclohex-1-eneyl)-but-3-ene-2-one | 1-5% |
| 3a,4,5,6,7,7a-hexahydro-4,7-methano-1H-inden-6-yl-propanoic acid | 1-5% |
| 2-tert-butylcyclohexylacetic acid | 1-5% |
| 2-heptylcyclopentanone | 1-5% |
| pentadecan-15-olide | 1-5% |
| 2H-1-benzopyran-2-one | 0.1-1% |
| 2,6-di-tert-butyl-p-cresol | 0.1-1% |
| 4-methyl-3-decen-5-ol | 0.1-1% |
| 2,4-dimethyl-3-cyclohexene-1-carboxaldehyde | 0.1-1% |
| [(2E)-3,7-dimethylocta-2,6-dienyl] acetate | 0.1-1% |
| allyl hexanoate | 0.1-1% |
| 2-methylundecanal | 0.1-1% |
| 10-undecenal | 0.1-1% |
| cis-3,7-dimethyl-2,6-octadienylethanoate | 0.1-1% |
| 3,7,11-trimethyldodeca-1,6,10-trien-3-ol | 0.1-1% |
| undecan-2-one | 0.1-1%. |

At least one fragrance is used as the core material. Fragrance or perfume oils optimized for microencapsulation for the washing and cleaning agent sector, such as the fragrance formulation Weiroclean (Kurt Kitzing GmbH), are particularly preferred. The fragrances can be used in the form of a solid or liquid formulation, but especially in liquid form.

Fragrances that can be used as the core material are not particularly limited. Thus, individual fragrance compounds of natural or synthetic origin, for example of the ester, ether, aldehyde, ketone, alcohol and hydrocarbon type, can be used. Fragrance compounds of the ester type are e.g., benzyl acetate, phenoxyethyl isobutyrate, p-tert-butylcyclohexyl acetate, linalyl acetate, dimethylbenzylcarbinyl acetate (DMBCA), phenylethyl acetate, benzyl acetate, ethylmethylphenyl glycinate, allylcyclohexyl propionate, styrallyl propionate, benzyl salicylate, cyclohexyl salicylate, floramate, melusate, and jasmacyclate. The ethers include, for example, benzyl ethyl ether and ambroxan, the aldehydes include the ones mentioned above, for example the linear alkanals having 8 to 18 carbon atoms, citral, citronellal, citronellyloxyacetaldehyde, cyclamenaldehyde (3-(4-propan-2-ylphenyl)butanal), filial and bourgeonal, the ketones include, for example, the ionones, [alpha]-isomethylionone and methylcedrylketone, the alcohols include anethole, citronellol, eugenol, geraniol, linalool, phenylethyl alcohol and terpineol, the hydrocarbons mainly include terpenes such as limonene and pinene. Preferably, mixtures of different fragrances are used, which together produce an appealing fragrance note.

Suitable fragrance aldehydes can be selected from adoxal (2,6,10-trimethyl-9-undecenal), anisaldehyde (4-methoxybenzaldehyde), cymal or cyclamenaldehyde (3-(4-isopropylphenyl)-2-methylpropanal), nympheal (3-(4-isobutyl-2-methylphenyl) propanal), ethyl vanillin, florhydral (3-(3-isopropylphenyl) butanal]), trifernal (3-phenylbutyraldehyde), helional (3-(3,4-methylenedioxyphenyl)-2-methylpropanal), heliotropin, hydroxycitronellal, lauraldehyde, lyral (3- and 4-(4-hydroxy-4-methylpentyl)-3-cyclohexen-1-carboxaldehyde), methylnonylacetaldehyde, filial (3-(4-tert-butylphenyl)-2-methylpropanal), phenylacetaldehyde, undecylenaldehyde, vanillin, 2,6,10-trimethyl-9-undecenal, 3-dodecen-1-al, alpha-n-amylcinnamaldehyde, melonal (2,6-dimethyl-5-heptenal), triplal (2,4-dimethyl-3-cyclohexene-1-carboxaldehyde), 4-methoxybenzaldehyde, benzaldehyde, 3-(4-tert-butylphenyl)propanal, 2-methyl-3-(para-methoxyphenyl)propanal, 2-methyl-4-(2,6,6-timethyl-2(1)-cyclohexen-1-yl)butanal, 3-phenyl-2-propenal, cis-/trans-3,7-dimethyl-2,6-octadien-1-al, 3,7-dimethyl-6-octen-1-al, [(3,7-dimethyl-6-octenyl) oxy]acetaldehyde, 4-isopropylbenzylaldehyde, 1,2,3,4,5,6,7,8-octahydro-8,8-dimethyl-2-naphthaldehyde, 2,4-dimethyl-3-cyclohexene-1-carboxaldehyde, 2-methyl-3-(isopropylphenyl)propanal, 1-decanal, 2,6-dimethyl-5-heptenal, 4-(tricyclo[5.2.1.0(2,6)]-decylidene-8)-butanal, octahydro-4,7-methane-1H-indenecarboxaldehyde, 3-ethoxy-4-hydroxybenzaldehyde, para-ethyl-alpha,alpha-dimethylhydrocinnamaldehyde, alpha-methyl-3,4-(methylenedioxy) hydrocinnamaldehyde, 3,4-methylenedioxybenzaldehyde, alpha-n-hexylcinnamaldehyde, m-cymen-7-carboxaldehyde, alpha-methylphenylacetaldehyde, tetrahydrocitral (3,7-dimethyloctanal), undecenal, 2,4,6-trimethyl-3-cyclohexene-1-carboxaldehyde, 4-(3)(4-methyl-3-pentenyl)-3-cyclohexenecarboxaldehyde, 1-dodecanal, 2,4-dimethylcyclohexene-3-carboxaldehyde, 4-(4-hydroxy-4-methylpentyl)-3-cylohexene-1-carboxaldehyde, 7-methoxy-3,7-dimethyloctan-1-al, 2-methyldecanal, 1-nonanal, 1-octanal, 2,6,10-trimethyl-5,9-undecadienal, 2-methyl-3-(4-tert-butyl)propanal, dihydrocinnamaldehyde, 1-methyl-4-(4-methyl-3-pentenyl)-3-cyclohexene-1-carboxaldehyde, 5- or 6-methoxyhexahydro-4,7-methanindan-1- or -2-carboxaldehyde, 3,7-dimethyloctan-1-al, 1-undecanal, 10-undecen-1-al, 4-hydroxy-3-methoxybenzaldehyde, 1-methyl-3-(4-methylpentyl)-3-cyclohexenecarboxaldehyde, 7-hydroxy-3,7-dimethyl-octanal, trans-4-decenal, 2,6-nonadienal, para-tolylacetaldehyde, 4-methylphenylacetaldehyde, 2-methyl-4-(2,6,6-trimethyl-1-cyclohexen-1-yl)-2-butenal, ortho-methoxycinnamaldehyde, 3,5,6-trimethyl-3-cyclohexenecarboxaldehyde, 3,7-dimethyl-2-methylene-6-octenal, phenoxyacetaldehyde, 5,9-dimethyl-4,8-decadienal, peony aldehyde (6,10-dimethyl-3-oxa-5,9-undecadien-1-al), hexahydro-4,7-methanindane-1-carboxaldehyde, 2-methyloctanal, alpha-methyl-4-(1-methylethyl) benzene acetaldehyde, 6,6-dimethyl-2-norpinene-2-propionaldehyde, para-methylphenoxyacetaldehyde, 2-methyl-3-phenyl-2-propen-1-al, 3,5,5-trimethylhexanal, hexahydro-8,8-dimethyl-2-naphthaldehyde, 3-propylbicyclo[2.2.1]-hept-5-en-2-carbaldehyde, 9-decenal, 3-methyl-5-phenyl-1-pentanal, floral (4,8-Dimethyl-4,9-decadienal), aldehyde C12MNA (2-methylundecanal), liminal (beta-4-dimethylcyclohex-3-ene-1-propan-1-al), methylnonylacetaldehyde, hexanal, trans-2-hexenal and mixtures thereof.

Suitable fragrance ketones include, but are not limited to, methyl beta-naphthyl ketone, musk indanone (1,2,3,5,6,7-hexahydro-1,1,2,3,3-pentamethyl-4H-inden-4-on), calone (methylbenzodioxepinone), tonalide (6-acetyl-1,1,2,4,4,7-hexamethyltetralin), alpha-damascone, beta-damascone, delta-damascone, iso-damascone, damascenone, methyldihydrojasmonate (hedione), menthone, carvone, camphor, koavone (3,4,5,6,6-pentamethylhept-3-en-2-one), fenchone, alpha-ionone, beta-ionone, dihydro-beta-ionone, gamma-methyl-ionone, fleuramone (2-heptylcyclopentanone), frambinone methyl ether (4-(4-methoxyphenyl)butan-2-one), dihydrojasmone, cis-jasmone, 1-(1,2,3,4,5,6,7,8-octahydro-2,3,8,8-tetramethyl-2-naphthalenyl)-ethan-1-one and isomers thereof, methylcedrenyl ketone, acetophenone, methylacetophenone, para-methoxyacetophenone, methyl-beta-naphthyl ketone, benzylacetone, benzophenone, para-hydroxyphenylbutanone, celery ketone (3-methyl-5-propyl-2-cyclohexenone), 6-isopropyldeca-hydro-2-naphthone, dimethyloctenone, freskomenthe (2-butan-2-ylcyclohexan-1-one), 4-(1-ethoxyvinyl)-3,3,5,5-tetramethylcyclohexanone, methylheptenone, 2-(2-(4-methyl-3-cyclohexen-1-yl)propyl)cyclopentanone, 1-(p-menthen-6(2)yl)-1-propanone, 4-(4-hydroxy-3-methoxyphenyl)-2-butanone, 2-acetyl-3,3-dimethylnorbornane, 6,7-dihydro-1,1,2,3,3-pentamethyl-4 (5H) indanone, 4-damascol, dulcinyl (4-(1,3-benzodioxol-5-yl)butan-2-one), hexalone (1-(2,6,6-trimethyl-2-cyclohexene-1-yl)-1,6-heptadien-3-one), isocyclemone E (2-acetonaphthon-1,2,3,4,5,6,7,8-octahydro-2,3,8,8-tetramethyl), methyl nonyl ketone, methyl cyclocitrone, methyl lavender ketone, orivone (4-tert-amyl-cyclohexanone), 4-tert-butyl cyclohexanone, delphone (2-pentyl cyclopentanone), muscone (CAS 541-91-3), neobutenone (1-(5,5-dimethyl-1-cyclo-hexenyl)pent-4-en-1-one), plicatone (CAS 41724-19-0), veloutone (2,2,5-trimethyl-5-pentylcyclopentan-1-one), 2,4,4,7-tetramethyl-oct-6-en-3-one, tetramerane (6,10-dimethylundecen-2-one) and mixtures thereof.

The core materials can also contain natural fragrance mixtures, such as those obtainable from plant sources, for example pine, citrus, jasmine, patchouli, rose or ylang-ylang oil. Likewise suitable are muscatel sage oil, chamomile oil, clove oil, lemon balm oil, mint oil, cinnamon leaf oil, lime blossom oil, juniper berry oil, vetiver oil, olibanum oil, galbanum oil, and labdanum oil, as well as orange blossom oil, neroli oil, orange peel oil, and sandalwood oil. Further conventional fragrances which can be contained in the agents are, for example, the essential oils such as angelica root oil, anise oil, arnica flower oil, basil oil, bay oil, champak flower oil, noble fir oil, noble fir cone oil, elemi oil, eucalyptus oil, fennel oil, spruce needle oil, galbanum oil, geranium oil, ginger grass oil, guaiacum wood oil, gurjun balsam oil, helichrysum oil, ho oil, ginger oil, iris oil, cajeput oil, calamus oil, chamomile oil, camphor oil, canaga oil, cardamom oil, cassia oil, pine needle oil, copaiva balsam oil, coriander oil, spearmint oil, caraway oil, cumin oil, lavender oil, lemon grass oil, lime oil, mandarin oil, lemon balm oil, musk seed oil, myrrh oil, clove oil, neroli oil, niaouli oil, olibanum oil, origanum oil, palmarosa oil, patchouli oil, Peru balsam oil, petitgrain oil, pepper oil, peppermint oil, allspice oil, pine oil, rose oil, rosemary oil, sandalwood oil, celery oil, spike lavender oil, star anise oil, turpentine oil, thuja oil, thyme oil, verbena oil, vetiver oil, juniper berry oil, wormwood oil, wintergreen oil, ylang-ylang oil, hyssop oil, cinnamon oil, cinnamon leaf oil, citronella oil, lemon oil and cypress oil as well as ambrettolide, ambroxan, α-amyl cinnammaldehyde, anethole, anisaldehyde, anise alcohol, anisole, anthranilic acid methyl ester, acetophenone, benzylacetone, benzaldehyde, benzoic acid ethyl ester, benzophenone, benzyl alcohol, benzyl acetate, benzyl benzoate, benzyl formate, benzyl valerianate, borneol, bornylacetate, boisambrene forte, α-bromostyrene, n-decylaldehyde, n-dodecyl aldehyde, eugenol, eugenol methyl ether, eucalyptol, farnesol, fenchone, fenchyl acetate, geranyl acetate, geranyl formate, heliotropin, heptin carboxylic acid methyl ester, heptaldehyde, hydroquinone dimethyl ether, hydroxycinnamaldehyde, hydroxycinnamyl alcohol, indole, irone, isoeugenol, isoeugenol methyl ether, isosafrol, jasmone, camphor, carvacrol, carvone, p-cresol methyl ether, coumarin, p-methoxyacetophenone, methyl n-amyl ketone, methylanthranilic acid methyl ester, p-methylacetophenone, methylchavicol, p-methylquinoline, methyl-β naphthyl ketone, methyl-n-nonyl acetaldehyde, methyl-n-nonyl ketone, muscone, β-naphthol ethyl ether, β-naphthol methyl ether, nerol, n-nonyl aldehyde, nonyl alcohol, n-octyl aldehyde, p-oxy-acetophenone, pentadecanolide, β-phenylethyl alcohol, phenylacetic acid, pulegone, safrole, salicylic acid isoamyl ester, salicylic acid methyl ester, salicylic acid hexyl ester, salicylic acid cyclohexyl ester, santalol, sandelice, skatole, terpineol, thymene, thymol, troenan, γ-undelactone, vanillin, veratraldehyde, cinnamaldehyde, cinnamyl alcohol, cinnamic acid, cinnamic acid ethyl ester, cinnamic acid benzyl ester, diphenyl oxide, limonene, linalool, linalyl acetate and propionate, melusate, menthol, menthone, methyl-n-heptenone, pinene, phenylacetaldehyde, terpinyl acetate, citral, citronellal and mixtures thereof.

The tightness of the capsule wall can be influenced by the choice of shell components. According to one embodiment, the microcapsules have a tightness that allows leakage of at most 75 wt. %, at most 70 wt. %, at most 65 wt. %, at most 60 wt. %, at most 55 wt. % at most 50 wt. %, at most 45 wt. %, at most 40 wt. %, of the core material used when stored over a period of 12 weeks at a temperature of 0 to 40° C. The microcapsules are stored in a model formulation that corresponds to the target application. The microcapsules are also storage stable in the product in which they are used. For example in washing agents, cleaning agents, dishwashing detergents and fabric softeners as well as textile care products. The guide formulations for these products are known to the person skilled in the art. Typically, the pH around the microcapsules during storage is in the range of 2 to 11.

The second layer can be arranged on the inside or the outside of the first layer. According to one embodiment, the second layer is arranged on the inside of the first layer. Such an arrangement has the advantage that the impervious layer can also serve as a chemical protective layer between the biodegradable first layer and the core material. This is particularly important in cases where the core material can chemically attack the biodegradable material of the first layer. The problem with this structure is that the very thin second layer must first be formed as a template during the encapsulation. In this case, this was solved by selecting the appropriate murals and additives. An advantage of the template strategy, i.e., the preparation of the capsule starting with the construction of the very thin second layer as a template, is that in this preparation the components used as wall formers can be placed in the continuous water phase, which means that there is minimal contact with the core material during the construction of the shell. The components of the additional first layer can then be deposited as the first layer without interaction with the core material.

The microcapsule shells have at least two layers, i.e., they can have, for example, two layers, three layers, four layers or five layers. The microcapsules preferably have two or three layers.

According to one embodiment, the microcapsule has a third layer which is arranged on the outside of the first layer. In a further embodiment, the third layer is arranged on the outside of the second layer. In this embodiment, the second layer is preferably on the outside of the first layer. This third layer can be used to tailor the surface properties of the microcapsule for a specific application. Mention should be made here of the improvement in the adhesion of the microcapsules to a wide variety of surfaces and a reduction in agglomeration. The third layer also binds residual aldehyde quantities, thereby reducing the content of free aldehydes in the capsule dispersion. Furthermore, it can provide additional (mechanical) stability or further increase the tightness. Depending on the application, the third layer can contain a component selected from amines, organic salts, inorganic salts, alcohols, ethers, polyphosphazenes, and precious metals.

Precious metals increase the tightness of the capsules and can give the microcapsule surface additional catalytic properties or the antibacterial effect of a silver layer. Organic salts, in particular ammonium salts, lead to cationization of the microcapsule surface, which means that it adheres better to textiles, for example. When incorporated via free hydroxyl groups, alcohols also lead to the formation of H bridges, which also allow better adhesion to substrates. An additional polyphosphazene layer or a coating with inorganic salts, e.g. silicates, leads to an additional increase in tightness without affecting biodegradability. According to a preferred embodiment, the third layer contains activated melamine. On the one hand, the melamine catches possible free aldehyde parts of the second layer, increases the tightness and stability of the capsule and can also influence the surface properties of the microcapsules and thus the adhesion and agglomeration behavior.

Due to the low wall thicknesses, the proportion of the second layer in the shell based on the total weight of the shell is at most 30%. For high biodegradability, the proportion is at most 25 wt. % based on the total weight of the shell. The proportion of the second layer is particularly preferably not more than 20 wt. %. The proportion of the first layer on the shell based on the total weight of the shell is at least 40 wt. %, preferably at least 50 wt. %, particularly preferably at least 60 wt. %. The proportion of the third layer on the shell, based on the total weight of the shell, is at most 25%, preferably at most 20 wt. %, particularly preferably at most 15 wt. %.

The size of the microcapsules is in the range customary for microcapsules. The diameter can be in the range from 100 nm to 1 mm. The diameter depends on the exact capsule composition and the preparation process. The peak maximum of the particle size distribution is regularly used as a parameter for the size of the capsules. The peak maximum of the particle size distribution is preferably in the range from 1 μm to 500 μm. The peak-Maximum of the particle size distribution can for example be 1 μm, 2 μm, 3 μm, 4 μm, 5 μm, 10 μm, 15 μm, 20 μm, 30 μm, 40 μm, 50 μm, 60 μm, 70 μm, 80 μm, 90 μm, 100 μm, 120 μm, 140 μm, 160 μm, 180 μm 200 μm, 250 μm, 300 μm, 350 μm, 400 μm, 450 μm or 500 μm. According to a particularly preferred embodiment, the microcapsules have a peak maximum of the particle size distribution of 10 μm to 100 μm. In particular, the peak maximum of the particle size distribution is in the range from 10 μm to 50 μm.

Washing or Cleaning Agents Comprising Microcapsules

Due to the robustness or tightness of these biodegradable capsules, they can be used advantageously in a washing and cleaning agent, these agents including fabric softeners, textile care products, solid washings, for example granules or powders, liquid washings, household cleaners, bathroom cleaners, hand dishwashing detergents, and machine dishwashing detergents.

The washing or cleaning agents preferably comprise at least one ingredient selected from the group consisting of surfactants, enzymes, builders and agents that enhance absorption.

The washing and cleaning agents can also contain anionic, nonionic, cationic, amphoteric or zwitterionic surfactants or mixtures thereof. Furthermore, these agents can be present in solid or liquid form. In various embodiments, the surfactants comprise at least one anionic surfactant and/or at least one nonionic surfactant.

Suitable nonionic surfactants are in particular ethoxylation and/or propoxylation products of alkyl glycosides and/or linear or branched alcohols each having from 12 to 18 C atoms in the alkyl portion and from 3 to 20, preferably from 4 to 10, alkyl ether groups. Also usable are corresponding ethoxylation and/or propoxylation products of N-alkylamines, vicinal diols, fatty acid esters, and fatty acid amides which, with regard to the alkyl portion, correspond to the stated long-chain alcohol derivatives, and of alkylphenols having from 5 to 12 C atoms in the alkyl group.

Suitable anionic surfactants are in particular soaps and those containing sulfate or sulfonate groups preferably having alkali ions as cations. Soaps that can be used are preferably the alkali salts of saturated or unsaturated fatty acids having 12 to 18 C atoms. Fatty acids of this kind may also be used in a not completely neutralized form. Usable sulfate-type surfactants include the salts of sulfuric acid semiesters of fatty alcohols having from 12 to 18 C atoms and the sulfation products of the stated nonionic surfactants having a low degree of ethoxylation. Usable sulfonate-type surfactants include linear alkylbenzenesulfonates having from 9 to 14 C atoms in the alkyl portion, alkanesulfonates having from 12 to 18 C atoms, and olefin sulfonates having from 12 to 18 C atoms, resulting from the reaction of corresponding monoolefins with sulfur trioxide, and alpha-sulfo fatty acid esters, resulting from the sulfonation of fatty acid methyl or ethyl esters.

Cationic surfactants are preferably selected from among esterquats and/or quaternary ammonium compounds (QACs) according to the general formula $(R^{I})(R^{II})(R^{III})(R^{IV})N^{+} X^{-}$, in which $R^{I}$ to $R^{IV}$ represent $C_{1-22}$ alkyl groups, $C_{7-28}$ arylalkyl groups or heterocyclic groups that are the same or different, wherein two groups, or, in the case of aromatic bonding such as in pyridine, even three groups form, together with the nitrogen atom, the heterocycle, for example a pyridinium or imidazolinium compound, and $X^{-}$ represents halide ions, sulfate ions, hydroxide ions, or similar anions. QACs may be prepared by reacting tertiary amines with alkalizing agents, for example methyl chloride, benzyl chloride, dimethyl sulfate, dodecyl bromide, but also ethylene oxide. The alkylation of tertiary amines with a long alkyl group and two methyl groups is particularly simple; the quaternization of tertiary amines with two long groups and a methyl group may also be carried out under mild conditions using methyl chloride. Amines having three long alkyl groups or hydroxy-substituted alkyl groups are less reactive, and are quaternized using dimethyl sulfate, for example. Examples of suitable QACs are benzalkonium chloride (N-alkyl-N,N-dimethylbenzylammonium chloride), Benzalkon B (m,p-dichlorobenzyldimethyl-$C_{12}$ alkylammonium chloride, benzoxonium chloride (benzyldodecyl-bis-(2-hydroxyethyl) ammonium chloride), cetrimonium bromide (N-hexadecyl-N,N-trimethylammonium bromide), benzethonium chloride (N,N-dimethyl-N-[2-[2-[p-(1,1,3,3-tetramethylbutyl)phenoxy]ethoxy]ethyl] benzylammonium chloride), dialkyldimethylammonium chlorides such as di-n-decyldimethyl ammonium chloride, didecyldimethyl ammonium bromide, dioctyldimethyl ammonium chloride, 1-cetylpyridinium chloride, and thiazoline iodide, and mixtures thereof. Preferred QACs are benzalkonium chlorides having $C_8$-$C_{22}$ alkyl groups, in particular $C_{12}$-$C_{14}$ alkylbenzyldimethyl ammonium chloride.

Preferred esterquats are methyl-N-(2-hydroxyethyl)-N,N-di(talgacyloxyethyl) ammonium methosulfate, bis-(palmitoyl)ethylhydroxyethylmethyl ammonium methosulfate or methyl-N,N-bis(acyloxyethyl)-N-(2-hydroxyethyl) ammonium methosulfate. Commercially available examples are the methylhydroxyalkyldialkoyloxyalkyl ammonium methosulfates marketed by Stepan under the trademark Stepantex®, the products from BASF SE known under the trade name Dehyquart®, or the products from Evonik known under the name Rewoquat®.

The amounts of the individual ingredients in the washing and cleaning agents in each case depend on the intended purpose of the composition in question, and a person skilled in the art is in principle familiar with the ranges of the amounts of ingredients that should be used, or can obtain these from the relevant technical literature. Depending on the intended purpose of the composition, the surfactant content, for example, is selected to be higher or lower. For example, the surfactant content of washing agents, for example, can usually be from 10 to 50 wt. %, preferably from 12.5 to 30 wt. % and more preferably from 15 to 25 wt. %.

The washing and cleaning agents can contain, for example, at least one water-soluble and/or water-insoluble, organic and/or inorganic builder. The water-soluble organic builders include polycarboxylic acids, in particular citric acid and saccharic acids, monomeric and polymeric aminopolycarboxylic acids, in particular methylglycinediacetic acid, nitrilotriacetic acid, ethylenediaminetetraacetic acid and polyaspartic acid, polyphosphonic acids, in particular amino tris(methylenephosphonic acid), ethylenediamine tetrakis(methylenephosphonic acid) and 1-hydroxyethane-1,1-diphosphonic acid, polymeric hydroxy compounds such as dextrin, and polymeric (poly)carboxylic acids, polymeric acrylic acids, methacrylic acids, maleic acids, and mixed polymers thereof, which may also contain, in the polymer, small portions of polymerizable substances, without a carboxylic acid functionality. Compounds of this class which are suitable, although less preferred, are copolymers of acrylic acid or methacrylic acid with vinyl ethers, such as vinyl methyl ethers, vinyl esters, ethylene, propylene and styrene, in which the proportion of the acid is at least 50 wt. %. In particular for preparing liquid washing and cleaning agents, the organic builder substances may be used in the form of aqueous solutions, preferably in the form of 30 to 50 wt. % aqueous solutions. All mentioned acids are generally used in the form of the water-soluble salts thereof, in particular alkali salts thereof.

Organic builder substances, if desired, can be contained in amounts of up to 40 wt. %, in particular up to 25 wt. %, and preferably from 1 wt. % to 8 wt. %. Amounts close to the stated upper limit are preferably used in paste-form or liquid, in particular water-containing, agents. Laundry post-treatment agents, such as softeners, may optionally also be free of organic builders.

In particular alkali silicates and polyphosphates, preferably sodium triphosphate, are suitable as water-soluble inorganic builder materials. In particular crystalline or amorphous alkali aluminosilicates, if desired, can be used as water-insoluble, water-dispersible inorganic builder materials in amounts of up to 50 wt. %, preferably no greater than 40 wt. %, and in liquid compositions in particular in amounts of from 1 wt. % to 5 wt. %. Among these, crystalline sodium aluminosilicates of washing agent quality, in particular zeolite A, P and optionally X, are preferred. Amounts close to the stated upper limit are preferably used in solid particulate agents. Suitable aluminosilicates have in particular no particles having a particle size greater than 30 μm and preferably consist of up to at least 80 wt. % of particles having a size smaller than 10 μm.

Suitable substitutes or partial substitutes for the stated aluminosilicate are crystalline alkali silicates, which may be present alone or in a mixture with amorphous silicates. The alkali silicates that can be used in the washing or cleaning agents as builders preferably have a molar ratio of alkali oxide to $SiO_2$ of less than 0.95, in particular from 1:1.1 to 1:12, and may be present in amorphous or crystalline form. Preferred alkali silicates are sodium silicates, in particular amorphous sodium silicates, having a $Na_2O:SiO_2$ molar ratio of from 1:2 to 1:2.8. Crystalline phyllosilicates of the general formula $Na_2Si_xO_{2x+1}\cdot yH_2O$, where x, referred to as the module, is a number from 1.9 to 4, y is a number from 0 to 20, and preferred values for x are 2, 3 or 4, are preferably used as crystalline silicates, which may be present alone or in a mixture with amorphous silicates. Preferred crystalline phyllosilicates are those in which x in the stated general formula assumes the values 2 or 3. In particular, both beta- and delta-sodium disilicates ($Na_2Si_2O_5\cdot yH_2O$) are preferred. Practically water-free crystalline alkali silicates of the above general formula, in which x is a number from 1.9 to 2.1, which alkali silicates are produced from amorphous alkali silicates, may also be used. In a further preferred embodiment, a crystalline sodium phyllosilicate having a module of from 2 to 3, as can be produced from sand and soda, is used. Crystalline sodium silicates having a module in the range of from 1.9 to 3.5 are used in a further preferred embodiment of the textile treatment or cleaning agents. If alkali aluminosilicate, in particular zeolite, is also present as an additional builder, the weight ratio of aluminosilicate to silicate, based in each case on water-free active substances, is preferably from 1:10 to 10:1. In compositions containing both amorphous and crystalline alkali silicates, the weight ratio of amorphous alkali silicate to crystalline alkali silicate is preferably 1:2 to 2:1 and in particular 1:1 to 2:1.

Builder substances are, if desired, preferably contained in amounts of up to 60 wt. %, in particular from 5 wt. % to 40 wt. %. Laundry post-treatment agents, for example softeners, are preferably free of inorganic builders.

In various embodiments, an agent further comprises at least one enzyme.

The enzyme may be a hydrolytic enzyme or another enzyme in a concentration that is expedient for the effectiveness of the agent. One embodiment thus represents agents which comprise one or more enzymes. All enzymes which can develop catalytic activity in the agent, in particular a protease, amylase, cellulase, hemicellulase, mannanase, tannanase, xylanase, xanthanase, xyloglucanase, β-glucosidase, pectinase, carrageenanase, perhydrolase, oxidase, oxidoreductase or a lipase, and mixtures thereof, can preferably be used as enzymes. Enzymes are contained in the agent advantageously in an amount of from $1\times10^{-8}$ to 5 wt. % in each case, based on the active protein. Each enzyme is contained in agents in an amount of, in order of increasing preference, from $1\times10^{-7}$ to 3 wt. %, from 0.00001 to 1 wt. %, from 0.00005 to 0.5 wt. %, from 0.0001 to 0.1 wt. %, and particularly preferably from 0.0001 to 0.05 wt. %, based on the active protein. Particularly preferably, the enzymes exhibit synergistic cleaning performance against specific stains or spots, i.e., the enzymes contained in the agent composition support one another in their cleaning performance. Synergistic effects can arise not only between different enzymes, but also between one or more enzymes and other ingredients of the agent.

The amylase(s) is/are preferably an α-amylase. The hemicellulase is preferably a pectinase, a pullulanase and/or a mannanase. The cellulase is preferably a cellulase mixture or a single-component cellulase, preferably or predominantly an endoglucanase and/or a cellobiohydrolase. The oxidoreductase is preferably an oxidase, in particular a choline-oxidase, or a perhydrolase.

The proteases used are preferably alkaline serine proteases. They act as unspecific endopeptidases, i.e., they hydrolyze any acid amide bonds that are inside peptides or proteins and thereby remove protein-containing stains on the item to be cleaned. Their optimum pH is usually in the distinctly alkaline range. In preferred embodiments, the enzyme contained in the agent is a protease.

The enzymes that are used in the present case may be naturally occurring enzymes or enzymes which have been changed by one or more mutations based on naturally occurring enzymes, in order to positively influence desired properties such as catalytic activity, stability or disinfecting performance.

In preferred embodiments, the enzyme is present in the agent in the form of an enzyme product in an amount of 0.01 to 10 wt. %, preferably 0.01 to 5 wt. %, based on the total weight of the agent. The active protein content is preferably in the range from 0.00001 to 1 wt. %, in particular 0.0001 to 0.2 wt. %, based on the total weight of the agent.

The protein concentration can be determined using known methods, for example the BCA method (bicinchoninic acid; 2,2'-bichinolyl-4,4'-dicarboxylic acid) or the Biuret method. The active protein concentration is determined by titrating the active centers using a suitable irreversible inhibitor (e.g., phenylmethylsulfonylfluoride (PMSF) for proteases) and determining the residual activity (cf. M. Bender et al., J. Am. Chem. Soc. 88, 24 (1966), p. 5890-5913).

In the agents described herein, the enzymes to be used may furthermore be formulated together with accompanying substances, for example from fermentation. In liquid formulations, the enzymes are preferably used as enzyme liquid formulations.

The enzymes are generally not provided in the form of pure protein, but rather in the form of stabilized, storable and transportable preparations. These ready-made preparations include, for example, the solid preparations obtained through granulation, extrusion, or lyophilization or, particularly in the case of liquid or gel agents, solutions of the enzymes, which are advantageously maximally concentrated, have a low water content, and/or are supplemented with stabilizers or other auxiliaries.

Alternatively, the enzymes can also be encapsulated, for both the solid and the liquid administration form, for example by spray-drying or extrusion of the enzyme solution together with a preferably natural polymer or in the form of capsules, for example those in which the enzymes are enclosed in a set gel, or in those of the core-shell type, in which an enzyme-containing core is coated with a water-, air-, and/or chemical-impermeable protective layer. Further active ingredients such as stabilizers, emulsifiers, pigments, bleaching agents, or dyes can additionally be applied in overlaid layers. Such capsules are applied using methods that are known per se, for example by shaking or roll granulation or in fluidized bed processes. Such granules are advantageously low in dust, for example due to the application of polymeric film-formers, and stable in storage due to the coating.

Moreover, it is possible to formulate two or more enzymes together, such that a single granule exhibits a plurality of enzyme activities.

In various embodiments, the agent can have one or more enzyme stabilizers.

Agents that enhance adsorption are agents which improve the adsorption of the microcapsules to surfaces, in particular textile surfaces. This category of agents includes, for example, the esterquats already mentioned above. Further examples are so-called SRPs (soil repellent polymers), which can be nonionic or cationic, in particular polyethyleneimines (PEI) and ethoxylated variants thereof and polyesters, in particular esters of terephthalic acid, especially those of ethylene glycol and terephthalic acid or polyester/polyether of polyethylene terephthalate and polyethylene glycol. Finally, anionic and nonionic silicones also fall under this group. Exemplary compounds are also disclosed in patent specification EP 2 638 139 A1.

Furthermore, the washing and cleaning agents may additionally contain other ingredients which further improve the practical and/or aesthetic properties of the composition, depending on the intended use. They may contain bleaching agents, bleach activators, bleach catalysts, esterquats, silicone oils, emulsifiers, thickeners, electrolytes, pH adjusters, fluorescing agents, dyes, hydrotropes, suds suppressors, anti-redeposition agents, solvents, optical brighteners, graying inhibitors, anti-shrink agents, crease-preventing agents, dye transfer inhibitors, color-protection agents, wetting promoters, antimicrobial active ingredients, germicides, fungicides, antioxidants, corrosion inhibitors, clear rinsers, preservatives, antistatic agents, ironing aids, waterproofing and impregnating agents, pearlescing agents, polymers, swelling and anti-slip agents and UV absorbers, without being limited to these.

Suitable ingredients and framework compositions for washing and cleaning agent compositions (for example for washing agents and fabric softeners) are disclosed, for example, in EP 3 110 393 B1.

Preparation Process

Processes for preparing core/shell microcapsules are known to the person skilled in the art. As a rule, an oil-based core material that is insoluble or sparingly soluble in water is emulsified or dispersed in an aqueous phase containing the wall formers. Depending on the viscosity of liquid core materials, a wide variety of units are used, from simple stirrers to high-performance dispersers, which distribute the core material into fine oil droplets. The wall formers separate from the continuous water phase on the oil droplet surface and can then be crosslinked. This mechanism is used in the in situ polymerization of amino and phenoplast microcapsules and in the coacervation of water-soluble hydrocolloids. In contrast, free-radical polymerization uses oil-soluble acrylate monomers to form the wall. In addition, methods are used in which water-soluble and oil-soluble starting materials are reacted at the phase boundary of the emulsion droplets that form the solid shell.

Examples of this are the reaction of isocyanates and amines or alcohols to form polyurea or polyurethane walls (interfacial polymerization), but also the hydrolysis of silicate precursors with subsequent condensation to form an inorganic capsule wall (sol-gel process).

Described herein is a method for preparing microcapsules comprising a fragrance as a core material and a shell consisting of three layers. The very thin second layer serving as a diffusion barrier is preferably provided as a template during preparation. To build up this second layer, very small proportions of wall formers of the type mentioned are required. After droplet formation at high stirring speeds, the sensitive templates are preferably equipped with an electrically negative charge by means of suitable protective colloids (e.g. AMPS) in such a way that neither Ostwald ripening nor coalescence can occur. After this stable emulsion has been prepared, the wall former, for example a suitable precondensate based on aminoplast resin, can form a much thinner shell (layer) compared to the prior art, with the stirring speed now greatly reduced. The thickness of the shell can be further reduced, in particular by adding an aromatic alcohol, for example m-aminophenol. This is followed by the formation of a shell structure that is capable of being prepared, which unexpectedly shows good affinity for the addition of proteins such as gelatin or alginate and deposits on the templates without the expected problems such as gelling of the sample, formation of agglomerations and incompatibility of the structuring agent.

The procedure comprises at least the following steps:

a) preparing an oil-in-water emulsion by emulsifying a core material in an aqueous phase, optionally with the addition of protective colloids;
b) addition of the inner shell layer wall-forming component(s), followed by deposition and curing, wherein the inner shell layer wall-forming component(s) are in particular an aldehyde component, an amine component and an aromatic alcohol;
c) addition of the wall-forming component(s) of the middle shell layer, followed by deposition and curing, wherein the wall-forming component(s) of the middle shell layer are in particular proteins and/or polysaccharides; and
d) optional addition of the wall-forming component(s) of the outer shell layer, followed by deposition and curing, wherein the wall-forming component(s) of the outer shell layer is in particular an amine component.

Alternatively, steps a) and b) can be carried out as follows:

a) Making an oil-in-water emulsion by emulsifying a core material in an aqueous phase in the presence of the wall-forming component(s) of the inner shell layer, optionally with the addition of protective colloids;
b) deposition and curing the wall-forming component(s) of the inner shell layer, wherein the wall-forming component(s) of the inner shell layer are in particular an aldehyde component, an amine component and an aromatic alcohol.

This process can be carried out either sequentially or as a so-called one-pot process. In the sequential method, only steps a) and b) are carried out in a first process until microcapsules are obtained with only the inner layer as the shell (intermediate microcapsules). A portion or the total amount of these intermediate microcapsules is then subsequently transferred to a further reactor. The further reaction steps are then carried out in this. In the one-pot process, all process steps are carried out in a batch reactor. The implementation without changing the reactor is particularly time-saving.

For this purpose, the overall system should be matched to the one-pot process. The right choice of the solids content, the right temperature control, the coordinated addition of formulation components and the sequential addition of the wall former is possible in this way.

In one embodiment of the method, the method comprises the preparation of a water phase by dissolving a protective colloid, in particular acrylamidosulfonate, and a methylated pre-polymer in water. The pre-polymer is preferably produced by reacting an aldehyde with either melamine or urea. Optionally, methanol can be used.

Furthermore, in the method, the water phase can be thoroughly mixed by stirring and setting a first temperature, the first temperature being in the range from 30 to 40° C. An aromatic alcohol, in particular phloroglucinol, resorcinol or aminophenol can then be added to the water phase and dissolved therein.

Alternatively, an oil phase can be produced in the method by mixing a fragrance composition or a phase change material (PCM) with aromatic alcohols, in particular phloroglucinol, resorcinol or aminophenol. Alternatively, reactive monomers or diisocyanate derivatives can also be incorporated into the fragrance composition. The first temperature can then be set.

A further step can be the preparation of a two-phase mixture by adding the oil phase to the water phase and then increasing the speed.

The emulsification can then be started by adding formic acid. A regular determination of the particle size is recommended. Once the desired particle size has been reached, the two-phase mixture can be stirred further and a second temperature can be set to cure the capsule walls. The second temperature can be in the range from 55° C. to 65° C.

A melamine dispersion can then be added to the microcapsule dispersion and a third temperature can be set, the third temperature preferably being in the range from 75 to 85° C.

Another suitable step is the addition of an aqueous urea solution to the microcapsule dispersion.

To produce the first shell, the microcapsule dispersion is added to a solution of gelatin and alginate. In this case, cooling to 45 to 55° C. would then take place and the pH of the microcapsule dispersion would be adjusted to a value in the range from 3.8 to 4.3, in particular 3.9.

The microcapsule dispersion can then be cooled to a fourth temperature, wherein the fourth temperature is in the range of 20 to 25° C. It can then be cooled to a fifth temperature, the fifth temperature being in a range from 4 to 17° C., in particular at 8° C.

The pH of the microcapsule dispersion would then be adjusted to a value in the range from 4.3 to 5.1 and glutaraldehyde or glyoxal added. The reaction conditions, in particular temperature and pH, can be chosen differently depending on the crosslinker. The person skilled in the art can derive the respectively suitable conditions from the reactivity of the crosslinker, for example. The added amount of glutaraldehyde or glyoxal influences the crosslinking density of the first layer and thus, for example, the tightness and degradability of the microcapsule shell. Accordingly, the person skilled in the art can vary the amount in a targeted manner in order to adapt the property profile of the microcapsule. To create the additional third layer, a melamine slurry can be prepared with melamine, formic acid and water. The addition of the melamine slurry to the microcapsule dispersion follows. Finally, the pH of the microcapsule dispersion would be adjusted to a value in the range of 9 to 12, especially 10 to 11.

EXAMPLES

Example 1—Preparation of the Microcapsule with a Three-Layer Structure

1.1 Materials

TABLE 1

List of substances used in the preparation of the microcapsules

| Substances | Concentration (%) | Quantity (g) |
|---|---|---|
| Lupasol PA140[1),*] | 20 | 3.4 |
| Luracoll SD[2),*] | 67 | 1.6 |
| Water addition 1 | 100 | 34.9 |
| Perfume oil Weiroclean* | 100 | 38.8 |
| Formic acid* addition 1 | 20 | 0.5 |
| Resorcinol solution | 12.2 | 2.5 |
| Melafin suspension[3),6)] addition 1 | 27 | 1.9 |
| Urea solution | 16.6 | 4.7 |
| Water addition 2 | 100 | 100.19 |
| Sodium sulfate* | 100 | 0.5 |
| Sodium alginate* | 100 | 1.4 |
| Pork skin gelatin* | 100 | 6.2 |
| Formic acid* addition 2[4)] | 20 | 1.4 |
| Sodium hydroxide addition 1[4)] | 20 | 0.8 |
| Relugan GT50[5),*] | 50 | 1.9 |
| Melafin suspension[3),6)] addition 2 | 27 | 6.7 |
| Sodium hydroxide addition 2[4)] | 20 | 2.2 |

1)Polymer based on: Acrylamidosulfonate, source: BASF 2)1,3,5-Triazine-2,4,6-triamine, polymer with formaldehyde, methylated (content (W/W): >=60%-<=80%), in water, source: BASF 3)Cyanuric triamide (melamine); source: OCI Nitrogen B.V.

4)Addition depends on the pH value (see preparation process)

5)Glutaral; glutaraldehyde; glutaric dialdehyde (content (W/W): 50%), water (content (W/W): 50%), source: BASF 6)Concentration related to the acidified suspension

*Quantities of the components refer to the merchandise and are used as supplied

1.2 Preparation Process

To produce the Reaction mixture 1, Lupasol PA140 and Luracoll SD with Water addition 1 were weighed into a glass beaker and premixed with a 4 cm dissolver disc. The beaker was fixed in the water bath and stirred with the dissolver disc at 500 rpm and 30° C. until a clear solution formed.

As soon as the Luracoll/Lupasol solution was clear and had reached 30-40° C., the perfume oil was added slowly and the speed adjusted (1100 rpm) so that the desired particle size was achieved. The pH of this mixture was then acidified by the addition of Formic acid addition 1.

It was emulsified for 20-30 minutes or extended accordingly until the desired particle size of 20-30 μm (peak max) was reached. The particle size was determined using a Beckmann-Coulter device (laser diffraction, Fraunhofer method). After the particle size had been reached, the speed was reduced in such a way that gentle mixing was ensured.

The resorcinol solution was then stirred in and preformed for 30-40 minutes while stirring gently. After the preforming time had elapsed, the emulsion temperature was increased to 50° C. within 15 minutes. When this temperature was reached, the mixture was increased to 60° C. over a period of 15 minutes and this temperature was maintained for a further 30 minutes. The Melafin suspension addition 1 was then adjusted to a pH of 4.5 with the aid of 20% formic acid and metered into the reaction mixture over a period of 90 minutes. Thereafter, the temperature was held for 30 minutes. After the 30 minutes had elapsed, the temperature was initially increased to 70° C. within 15 minutes. The temperature was then increased to 80° C. within 15 minutes and maintained for 120 minutes. Thereafter, the aqueous urea solution was added, the heat source was switched off and the Reaction mixture 1 was cooled to room temperature. In a separate beaker, sodium sulfate was dissolved in water while stirring with a paddle stirrer at 40 to 50° C. Sodium alginate and pigskin gelatin are slowly sprinkled into the heated water. After all solids had dissolved, Reaction mixture 1 was added to the prepared gelatin/sodium alginate solution with stirring. When a homogeneous mixture was reached, the pH was adjusted to 3.9 by slow dropwise addition of Formic acid addition 2, after which the heat source was removed. The sample was then cooled to room temperature. After reaching room temperature, the reaction mixture was cooled with ice. When the temperature had reached 8° C., the ice bath was removed and the pH was increased to 4.7 with addition of Sodium hydroxide solution addition 1. Then Relugan GT50 was added. Care was taken to ensure that the temperature before the Relugan GT50 was added did not exceed 16 to 20° C.

Subsequently, the Melafin suspension addition 2, which had been acidified to a pH value of 4.5 using 20% formic acid, was metered in slowly. The reaction mixture was then heated to 60° C. and held for 60 minutes when this temperature was reached. After this holding time, the heat source was removed and the microcapsule suspension was gently stirred for 14 hours. After 14 hours, the microcapsule suspension was adjusted to a pH of 10.5 by adding Sodium hydroxide solution addition 2.

1.3 Result

The resulting microcapsule MK 1 was examined under a light microscope. Typical recordings are shown in FIG. 1. To evaluate the MK 1, the pH, the solids content, the viscosity, the particle size and the content of core material in the slurry were determined. The result is shown in Table 2.

TABLE 2

Analysis results of the microcapsule MK 1

| | Measurement method | Example 1 |
|---|---|---|
| pH | pH electrode | 8-10 |
| Solids content [%] | Microwave | 20-30 |
| Viscosity [mPas] | Brookfield viscometer | <1000 |
| Particle size peak max. [μm] | Laser diffraction | 20-30 |
| Core material content in slurry [%] | Calculation from the recipe | 15-20 |

Example 2—Preparation of a Reference Microcapsule—Melamine-Formaldehyde Formulation 2.1 Materials The materials used to produce the reference microcapsules—melamine-formaldehyde are shown in Table 3.

TABLE 3

List of substances used in the preparation of the microcapsules

| Substances | Concentration*/% | Example 2 Quantity/(g) |
|---|---|---|
| Lupasol PA140[1)] | 20 | 35.0 |
| Luracoll SD[2)] | 67 | 42.5 |
| Perfume oil Weiroclean | 100 | 192.5 |
| Melafin[3),4)] - suspension | 27 | 48.8 |
| Urea solution | 28.6 | 70.0 |
| Deionized water for emulsion | 100 | 187.5 |
| Formic acid | 10 | 8.8 |

[1)]Polymer based on acrylamidosulfonate
[2)]1,3,5-Triazine-2,4,6-triamine, polymer with formaldehyde, methylated (content (W/W): >=60%-<=80%), in water
[3)]Melamine: Cyanuramides: 1,3,5-Trazine-2,4,6-triamine
[4)]Concentration related to the acidified suspension
*Quantities of the components refer to the merchandise and are used as supplied 2.2 Preparation Process (Based on Patent BASF EP 1 246693 B1)

Luracoll SD was stirred into deionized water and then Lupasol PA140 was added and stirred until a clear solution formed. The solution was warmed to 30 to 35° C. in a water bath. The perfume oil was added at 1100 rpm while stirring with a dissolver disk.

The pH of the oil-in-water emulsion was adjusted to 3.3 to 3.8 with 10% formic acid. The emulsion was then further stirred for 30 minutes at 1100 rpm until a droplet size of 20 to 30 μm was reached or correspondingly prolonged until the desired particle size of 20 to 30 μm (peak max) was reached. The particle size was determined using a Beckmann-Coulter device (laser diffraction, Fraunhofer method). Depending on the viscosity, the speed was reduced in such a way that thorough mixing was ensured. The mixture was stirred at this speed for a further 30 minutes at 30 to 40° C. The emulsion was then heated to 60° C. and stirred further.

The melamine suspension was adjusted to a pH of 4.5 with formic acid (10%) and metered into the reaction mixture. The sample was kept at 60° C. for 60 minutes and then heated to 80° C. After stirring at 80° C. for 60 minutes, the urea solution was added.

After cooling to room temperature, the microcapsule dispersion was filtered through a 200 μm mesh filter.

2.3 Result

Figure 2:
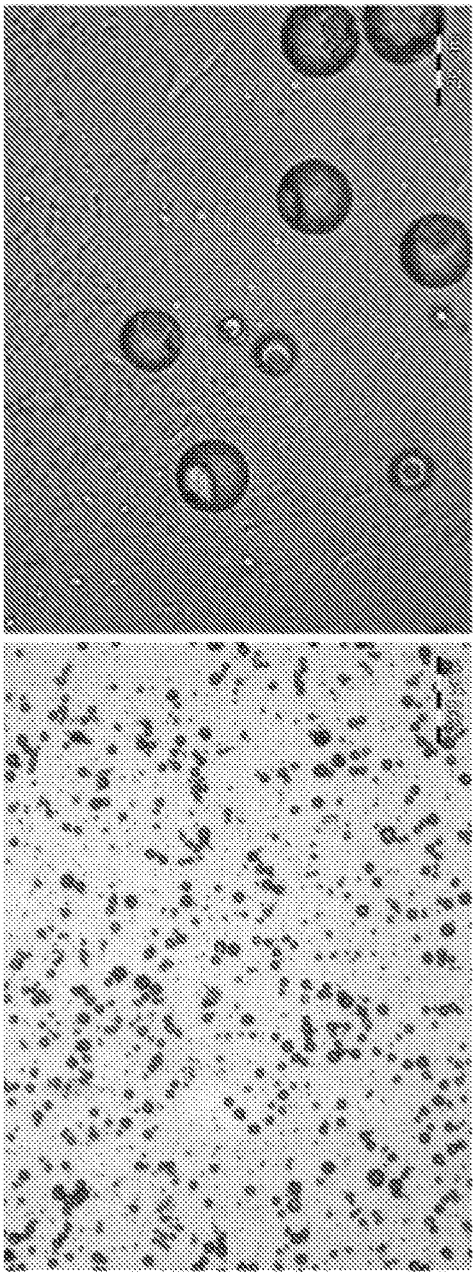
FIG. 2 is a photomicrograph of the reference microcapsule MK 2 (melamine-formaldehyde) magnified 50 times and 500 times, taken with an Olympus BX 50 microscope.

The MF reference microcapsule MK 2 obtained was examined under a light microscope. A typical recording of the MK 2 is shown in FIG. 2. To evaluate the microcapsules obtained, the pH, the solids content, the viscosity, the particle size and the content of core material in the slurry were determined. The result is shown in Table 4.

TABLE 4

Analysis results of the non-inventive reference microcapsule MK 2

| | Measurement method | Example 2 |
|---|---|---|
| pH | pH electrode | 5.5-6.5 |
| Solids content [%] | Microwave | 37-41 |
| Viscosity [mPas] | Brookfield viscometer | <1000 |
| Particle size peak max. [μm] | Laser diffraction | 20-30 |
| Core material content in slurry [%] | Calculation from the recipe | 30-35 |

Example 3—Preparation of a Reference Microcapsules—Gelatin/Alginate Formulation (Based on Patent DE 3424115)

3.1 Materials

The materials used to prepare the reference microcapsules—gelatin alginate are shown in Table 5.

TABLE 5

List of the substances used for the preparation and amounts used of the reference microcapsule MK 3

| Substances | Concentration*/% | Example 3 Quantity (g) |
|---|---|---|
| Water addition 1 | 100 | 204.4 |
| Sodium sulfate addition 1 | 100 | 0.9 |
| Sodium alginate | 100 | 2.9 |
| Pork skin gelatin | 100 | 12.7 |
| Sodium hydroxide addition 1[1)] | 20 | 1.0 |
| Perfume oil Weiroclean | 100 | 79.6 |

TABLE 5-continued

List of the substances used for the preparation and amounts used of the reference microcapsule MK 3

| Substances | Concentration*/% | Example 3 Quantity (g) |
|---|---|---|
| Sodium sulfate addition 2 | 100 | 0.8 |
| Water addition 2 | 100 | 180.5 |
| Acetic acid | 96 | 2.7 |
| Sodium hydroxide addition 2[1)] | 20 | 3.6 |
| Regulan GT50[2)] | 50 | 3.9 |
| Sodium hydroxide addition 3[1)] | 20 | 7.1 |

[1)]Addition depends on the pH value (see preparation process)
[2)]Glutaral; glutaraldehyde; glutardialdehyde (content (W/W): 50%), water (content (W/W): 50%)

3.2 Preparation Process

Sodium sulfate was weighed into an 800 ml beaker and dissolved by Water addition 1 while stirring with a paddle stirrer.

The perfume oil was weighed into a separate beaker and heated to 45° C. with stirring.

Sodium alginate and pigskin gelatin were slowly sprinkled into the sodium sulfate solution with stirring and dissolved. The pH was adjusted to 9.5 by adding Sodium hydroxide solution addition 1.

To produce an emulsion, the heated perfume oil was slowly added to the gelatin-alginate solution and the stirrer speed increased to 1200 rpm. During the emulsification, the droplet size was determined using a Beckmann-Coulter device (laser diffraction, Fraunhofer method). After a droplet size of 20-30 μm was reached, the speed was reduced to ensure gentle mixing.

In another beaker, the Sodium sulfate addition 2 was dissolved using Water addition 2. Then, concentrated acetic acid was added to this solution and heated to 45° C. with stirring.

The previously heated acetic acid/sodium sulfate solution was filled into a dropping funnel and metered into the emulsion over a period of 15 minutes. The stirring speed was chosen so that complete mixing is ensured.

After addition of the acetic acid solution, the mixture was cooled first to room temperature and then to 8° C. with ice while stirring.

When a suspension temperature of 8° C. was reached, the ice bath was removed and the pH was adjusted to 4.7 with addition of Sodium hydroxide solution addition 2. Then Regulan GT50 was added. Care was taken to ensure that the temperature of the suspension produced did not exceed 16-20° C. before the addition of the Regulan GT50.

The pH of the microcapsule suspension was then adjusted to 10.5 with stirring by slowly adding the Sodium hydroxide solution addition 3 dropwise (about 20 to 30 minutes).

3.3 Result

Figure 3:
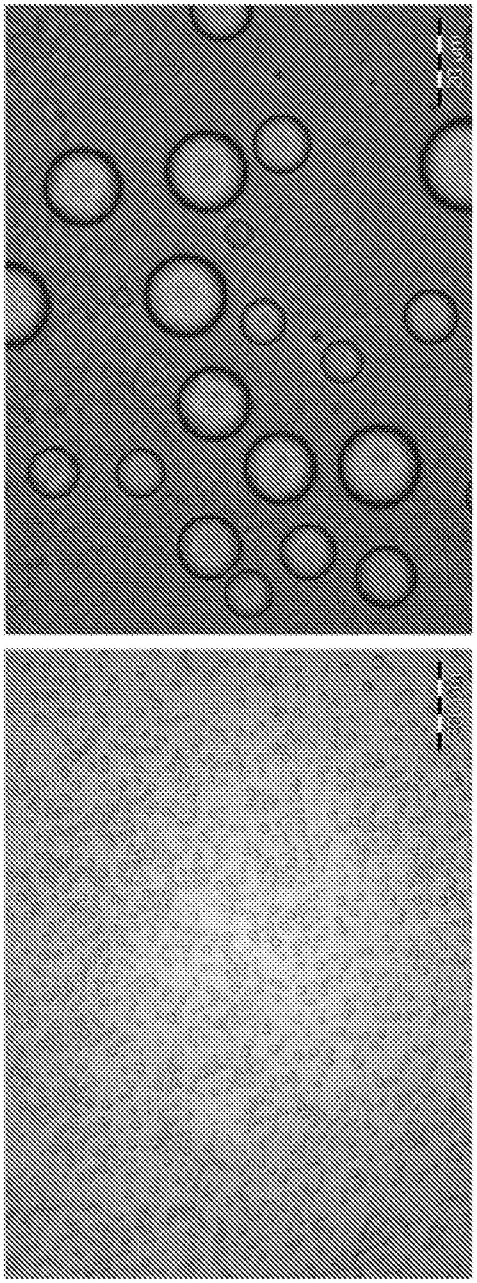
FIG. 3 is a photomicrograph of the reference microcapsule MK 3 (gelatin alginate) magnified 50 times and 500 times, taken with an Olympus BX 50 microscope.

The gelatin reference microcapsules MK 3 obtained were examined under a light microscope. A typical recording of the MK 3 is shown in FIG. 3. To evaluate the microcapsules obtained, the pH value, the solids content, the viscosity, the particle size and the core material content in the microcapsule suspension were determined. The result is shown in Table 8.

TABLE 6

Analysis results of the gelatin alginate reference microcapsule MK 3

| | Measurement method | Example 3 |
|---|---|---|
| pH | pH electrode | 8-10 |
| Solids content [%] | Microwave | 18-22 |
| Viscosity [mPas] | Brookfield viscometer | <1000 |
| Particle Size Peak Max. [μm] | Laser diffraction | 20-30 |
| Core material content in slurry [%] | Calculation from recipe | 14-18 |

Example 4—Preparation of Another Microcapsule with a Three-Layer Structure

4.1 Materials

TABLE 7

List of substances used in the preparation of the microcapsules

| Substances | Concentration (%) | Quantity (g) |
|---|---|---|
| Lupasol PA140[1),*] | 20 | 3.4 |
| Luracoll SD[2),*] | 67 | 1.6 |
| Water addition 1 | 100 | 34.9 |
| Perfume oil Weiroclean* | 100 | 38.8 |
| Formic acid* addition 1 | 20 | 0.5 |
| Resorcinol solution | 12.2 | 2.5 |
| Melafin suspension[3),6)] addition 1 | 27 | 1.9 |
| Urea solution | 16.6 | 4.7 |
| Water addition 2 | 100 | 100.2 |
| Sodium sulfate* | 100 | 0.5 |
| Sodium alginate* | 100 | 1.4 |
| Pork skin gelatin* | 100 | 6.2 |
| Formic acid* addition 2[4)] | 20 | 1.4 |
| Sodium hydroxide addition 1[4)] | 20 | 0.8 |
| Glyoxal 40%[5),*] | 40 | 1.4 |
| Melafin suspension[3),6)] addition 2 | 27 | 6.7 |
| Sodium hydroxide addition 2[4)] | 20 | 2.2 |

[1)]Polymer based on: Acrylamidosulfonate, source: BASF
[2)]1,3,5-Triazine-2,4,6-triamine, polymer with formaldehyde, methylated (content (W/W): >=60%-<=80%), in water, source: BASF
[3)]Cyanuric triamide (melamine); source: OCI Nitrogen B.V.
[4)]Addition depends on the pH value (see preparation process)
[5)]Glyoxal; oxalaldehyde (content (W/W): 40%), water (content (W/W): 60%), source: Sigma Aldrich
[6)]Concentration related to the acidified suspension
*Quantities of the components refer to the merchandise and are used as supplied

4.2 Preparation Method

To produce the Reaction mixture 1, Lupasol PA140 and Luracoll SD with Water addition 1 were weighed into a glass beaker and premixed with a 4 cm dissolver disc. The beaker was fixed in the water bath and stirred with the dissolver disc at 500 rpm and 30° C. until a clear solution formed.

As soon as the Luracoll/Lupasol solution was clear and had reached 30-40° C., the perfume oil was added slowly and the speed adjusted (1100 rpm) so that the desired particle size was achieved. The pH of this mixture was then acidified by the addition of Formic acid addition 1.

It was emulsified for 20-30 minutes or extended accordingly until the desired particle size of 20-30 μm (peak max) was reached. The particle size was determined using a Beckmann-Coulter device (laser diffraction, Fraunhofer method). After the particle size had been reached, the speed was reduced in such a way that gentle mixing was ensured.

The resorcinol solution was then stirred in and preformed for 30-40 minutes while stirring gently. After the preforming time had elapsed, the emulsion temperature was increased to 50° C. within 15 minutes. When this temperature was reached, the mixture was increased to 60° C. over a period of 15 minutes and this temperature was maintained for a further 30 minutes. The Melafin suspension addition 1 was then adjusted to a pH of 4.5 with the aid of 20% formic acid and metered into the reaction mixture over a period of 90 minutes. Thereafter, the temperature was held for 30 minutes. After the 30 minutes had elapsed, the temperature was initially increased to 70° C. within 15 minutes. The temperature was then increased to 80° C. within 15 minutes and maintained for 120 minutes. Thereafter, the aqueous urea solution was added, the heat source was switched off and the Reaction mixture 1 was cooled to room temperature. In a separate beaker, sodium sulfate was dissolved in water while stirring with a paddle stirrer at 40 to 50° C. Sodium alginate and pigskin gelatin are slowly sprinkled into the heated water. After all solids had dissolved, Reaction mixture 1 was added to the prepared gelatin/sodium alginate solution with stirring. When a homogeneous mixture was reached, the pH was adjusted to 3.9 by slow dropwise addition of Formic acid addition 2, after which the heat source was removed. The sample was then cooled to room temperature. After reaching room temperature, the reaction mixture was cooled with ice. When the temperature had reached 8° C., the ice bath was removed and the pH was increased to 4.7 with addition of Sodium hydroxide solution addition 1. Then the glyoxal solution was added. Care was taken to ensure that the temperature before the glyoxal solution was added did not exceed 16-20° C.

Subsequently, the melafin suspension addition 2, which had been acidified to a pH value of 4.5 using 20% formic acid, was metered in slowly. The reaction mixture was then heated to 60° C. and held for 60 minutes when this temperature was reached. After this holding time, the heat source was removed and the microcapsule suspension was gently stirred for 14 hours. After 14 hours, the microcapsule suspension was adjusted to a pH of 10.5 by adding Sodium hydroxide solution addition 2.

4.3 Result

Figure 6:
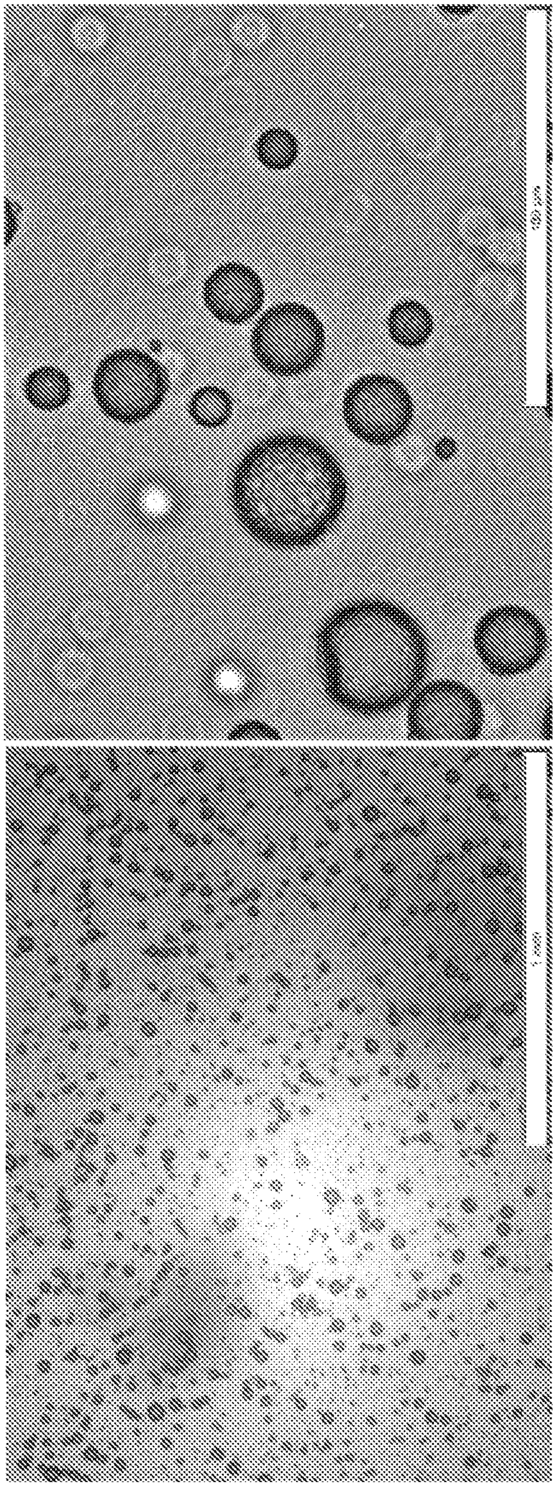
FIG. 6 is a photomicrograph of the capsules MK 4 in a 50× and 500× magnification recorded with an Olympus BX 50 microscope.

The resulting microcapsule MK 4 was examined under a light microscope. Typical recordings are shown in FIG. 6. To evaluate the MK 1a, the pH, the solids content, the viscosity, the particle size and the content of core material in the slurry were determined. The result is shown in Table 8.

TABLE 8

Analysis results of the microcapsule MK 1a

| | Measurement method | Example 1NEW |
|---|---|---|
| pH | pH electrode | 8-10 |
| Solids content [%] | Microwave | 20-30 |
| Viscosity [mPas] | Brookfield viscometer | <1000 |
| Particle size peak max. [μm] | Laser diffraction | 20-30 |
| Core material content in slurry [%] | Calculation from the recipe | 15-20 |

Example 5—Stability Measurement of the Microcapsules 5.1 Preliminary Remark

To determine the stability of microcapsules, they were stored in a model fabric softener formulation at 40° C. for a period of up to 12 weeks and the concentration of the fragrances diffused from the interior of the capsule into the surrounding formulation was determined using HS-GC/MS. Based on the measured values, the residual proportion of the perfume oil still in the capsule was calculated.

Model fabric softener formulation based on Rewoquat W E 18 E US from Evonik based on the recipe from the associated product data sheet:

To produce the fabric softener base, 94 g of water were heated to 50° C. and 5.65 g of Rewoquat WE 18 E US were added to the heated water with stirring. The mixture was cooled to room temperature, then the microcapsule dispersion was added.

5.2 Experimental Procedure

For this purpose, the microcapsule suspension (slurry) was carefully homogenized and stored at a concentration of 1 wt. % in the model formulation at 40° C., sealed airtight, in the heating cabinet. The non-encapsulated fragrance with an analogous concentration of fragrance in the model formulation serves as a comparison.

After a specified storage period, the samples were removed from the heating cabinet and an aliquot was weighed into a 20 ml headspace vial. The vial was then immediately sealed.

These patterns were analyzed by headspace SPME (Solid Phase Micro Extraction) using capillary gas chromatography and were evaluated after detection using a mass-selective detector (MSD).

5.3 Result

Table 9 shows the course of stability of the capsule according to Examples 1 and 2 and the reference capsule according to Example 3 over 12 weeks.

TABLE 9

Measured values of the stability study

| Storage duration Week | Capsules (Example 1) % Stability | Capsules (Example 4) % Stability | Melamine formaldehyde Capsules (Example 3) % Stability |
|---|---|---|---|
| 0 | 100 | 100 | 100 |
| 1 | 92 | 87 | 100 |
| 4 | 59 | 52 | 87 |
| 12 | 22 | 20 | 20 |

As can be seen from Table 9, the microcapsules MK 1 and MK 4 show a stability comparable to the MF reference microcapsule MK 2 after 12 weeks of storage in a model formulation.

Under the selected test conditions, the gelatin/alginate reference microcapsule MK 3 does not show any capsule stability in the test medium (disintegration already during sample preparation), so that it was not possible to record measured values for stability assessment within the required time frame.

For the calculation of the capsule stability, a change in the concentration of 16 individual ingredients of the encapsulated fragrance was considered. A reduction in stability results in the encapsulated fragrance escaping, which can then be detected by gas chromatography using headspace SPME. Since all capsule dispersions were adjusted to a defined oil content of 15 wt. %, a direct comparison of the capsule samples examined is possible. Individual ingredients (or their individual signals recorded by gas chromatography) which, due to fluctuations caused by measurement technology, indicate higher concentrations than were theoretically possible in comparison with the reference standard, were only taken into account in the evaluation up to the theoretical maximum concentration.

Example 6—Biodegradability Measurement of the Microcapsules (According to OECD 301 F)

6.1 General

This test is used to assess the rapid biodegradability of the microcapsules.

The standard test concentration of the samples to be examined is 1000 mg/l $O_2$. The measuring heads and the controller measure the oxygen consumption in a closed system. Due to the consumption of oxygen and the simultaneous binding of carbon dioxide that is produced to sodium hydroxide pellets, a negative pressure is created in the system. The measuring heads register and store this pressure over the set measuring period. The stored values are read into the controller using infrared transmission. They can be transferred to a PC and evaluated using the Achat OC program.

In order to eliminate the influence of the core material on degradation, perfluorooctane was encapsulated (degradation rate=<1%).

6.2 Equipment and Chemicals

Devices: OxiTop Control measuring system, from WTW incl. OxiTop OC 110 controller with interface cable for PC, 6 OxiTop C measuring heads, 6 glass bottles each with a total volume of 510 ml, 6 magnetic stirrers, 6 rubber quivers, 1 magnetic stirring system and Achat OC readout software Drying cabinet ORI-BSB, set to 20° C.

Air stones Oxygenius, 30×15×15 $mm^3$

Aquarium aeration pump Thomas—ASF No. 1230053

Nutsche filter D=90 mm

Suction flask 2 l

White band filter MN 640 d, D=90 mm, Macherey+Nagel

"System Oxi Top Control" manual, WTW

Chemicals: Activated sludge from the company's own or a municipal wastewater treatment plant Analytically pure ethylene glycol, Merck Reference sample with COD 1000 mg/l $O_2$ Walnut shell flour, Senger Naturrohstoffe Nutrient salt solution from the company's own or a municipal waste water treatment plant Analytically pure sodium hydroxide pellets>99%, Merck Cuvette test COD LCK 514, Dr. Lange 6.3 Procedure 6.3.1 Preparation of the Microcapsule Slurries The microcapsules MK 1, MK 2, MK 3 and MK 4 were produced according to the descriptions of Examples 1 to 4, with the difference that the completely persistent perfluorooctane (degradation rate<1%) was used as the core material instead of the perfume oil. This eliminates any influence of the core material on the test result.

In one embodiment, the capsule dispersion is washed after preparation by centrifuging and redispersing in water three times in order to separate off dissolved residues. For this purpose, a sample of 20 to 30 mL is centrifuged for 10 minutes at 12,000 rpm. After sucking off the clear supernatant, 20 to 30 mL water is added and the sediment is redispersed by shaking.

6.3.2 Sample Preparation

For the 28-day degradation tests, the microcapsule slurries were used as received from the preparation. In the case of the extended degradation tests over 60 days, the microcapsule slurries were washed after preparation by centrifuging and redispersing in water three times in order to separate off dissolved residues. For this purpose, a sample of 20 to 30 mL is centrifuged for 10 minutes at 12,000 rpm. After sucking off the clear residue, 20 to 30 mL water is added and the sediment is redispersed by shaking.

6.3.3 Preparation of the Reference Sample 711.6 mg of ethylene glycol was dissolved in a 1 L volumetric flask and filled in up to the mark. This corresponds to a COD of 1000 mg/l $O_2$. Ethylene glycol is considered to be readily biodegradable and is used here as a reference.

Due to the rapid degradation of ethylene glycol, walnut shell flour was added as an additional reference for the extended 60-day test. Walnut shell flour consists of a mixture of biopolymers, particularly cellulose and lignin, and serves as a solid-based biobased reference. Due to the slow breakdown of walnut shell flour, the course of the test can be followed over the entire period of 60 days. For this purpose, 117.36 g of walnut shell flour were dispersed homogeneously in 1 l of water with stirring. Aliquots of this mixture were taken with stirring for COD determination. The required quantity was calculated based on the average COD value of 1290±33 mg/l $O_2$ and transferred to the OxiTop bottles while stirring.

6.3.4 Preparation of the Biosludge

Activated sludge was removed from the outlet of the activated sludge tank of a factory or municipal wastewater treatment plant using a 20 l bucket. After 30 minutes of settling, the supernatant water was discarded.

The concentrated biosludge in the bucket was then permanently aerated for 3 days with the help of the aquarium pump and an air stone.

6.3.5 Determination of the Dry Content of the Biosludge

After 3 days, 100 ml of the concentrated biosludge were filtered off using a Nutsche filter over a white band filter. The filter cake is dried in a drying cabinet at 105° C. for 24 hours.

$$TG = \frac{A}{E}$$

TG=Dry content of the biosludge in %

E=Initial weight of the filter cake in g

A=Output weight of the filter cake in g c=TG×10 c=Concentration of biosludge in g/l 6.3.6 Adjustment of the Samples to a COD of 1000 mg/l $O_2$ The COD value of the samples to be examined was determined using the COD LCK 514 cuvette test. The sample is diluted with water until the COD value of 1000 mg/l $O_2$ is reached.

6.3.7 Preparation of the Samples

6 OxiTop bottles were used for one sample, since duplicate determinations are carried out in each case.

The following measurements were carried out in 2 bottles each (duplicate determination):

Biodegradability of the sample

Biodegradability of the ethylene glycol solution (=reference solution)

Blank test (=determination of the residual degradation of the sludge itself)

Each bottle requires:

25 ml sample with a COD of 1000 mg/l $O_2$ (in the case of a blank sample 25 ml distilled water)

3.5 ml nutrient solution 44.5 mg otro (oven-dried) sludge distilled water for filling up the bottle to a total volume of 250 ml Using a spatula, 3 sodium hydroxide pellets were placed in each rubber quiver. After adding the sample, nutrient solution, biosludge and distilled water to the bottles, a magnetic stir bar was placed in each bottle. Then the rubber quivers were placed on the respective bottle necks and the measuring heads screwed tightly onto the bottles.

6.4 Measurement and Evaluation

The programming of the OxiTop-C measuring heads and the evaluation of the data is described in detail in the "System OxiTop Control" manual from WTW.

6.5 Result

Figure 4A:
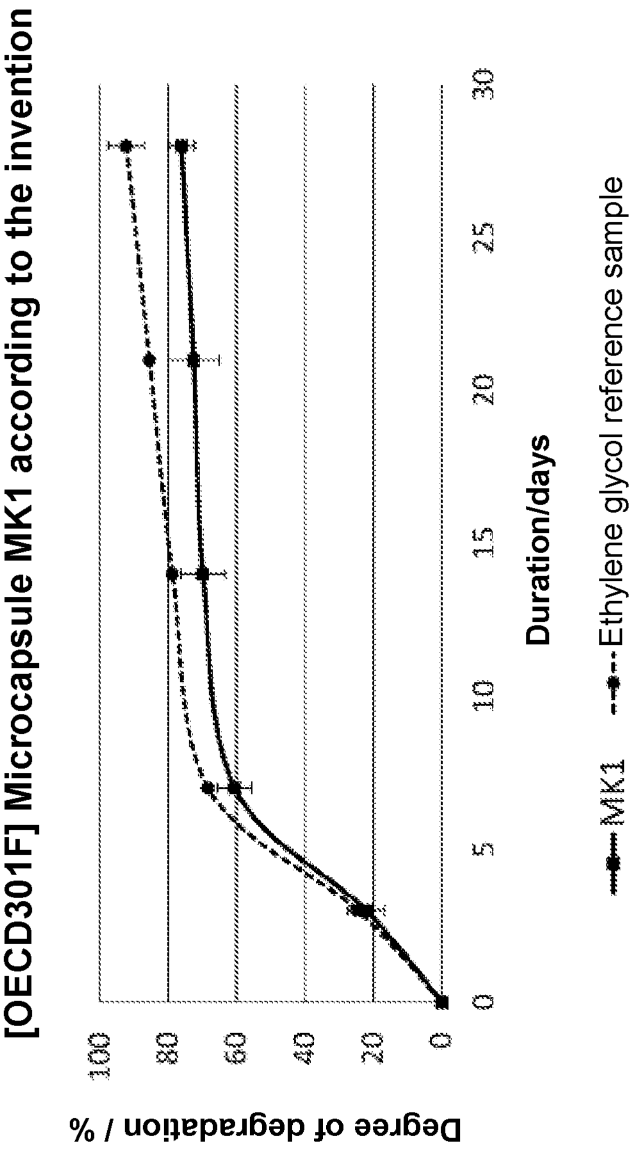
FIG. 4 is a diagram of the course of the biological degradation of the microcapsule MK 1 used over 28 days (shown as a solid line). (a) shows the result according to OECD 301 F. The breakdown of ethylene glycol is shown in the form of a dashed line as a positive control. (b) shows the result according to OECD 302 C. The breakdown of aniline is shown in the form of a dashed line as a positive control.
Figure 4B:
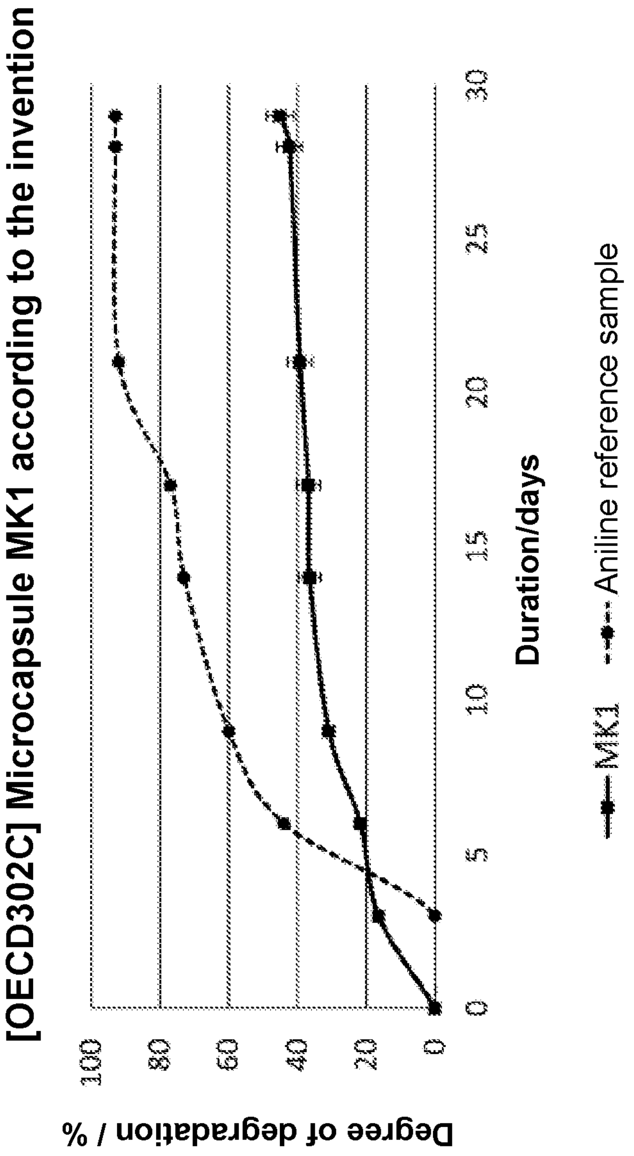

The biodegradation diagram of the capsule MK 1 according to OECD 301 F is shown in FIG. 4(*a*).

The capsule MK 1 shows a biodegradability of 76±4% after 28 days. Furthermore, the capsule MK 1a shows a biodegradability of 78±9% after 28 days.

Figure 7:
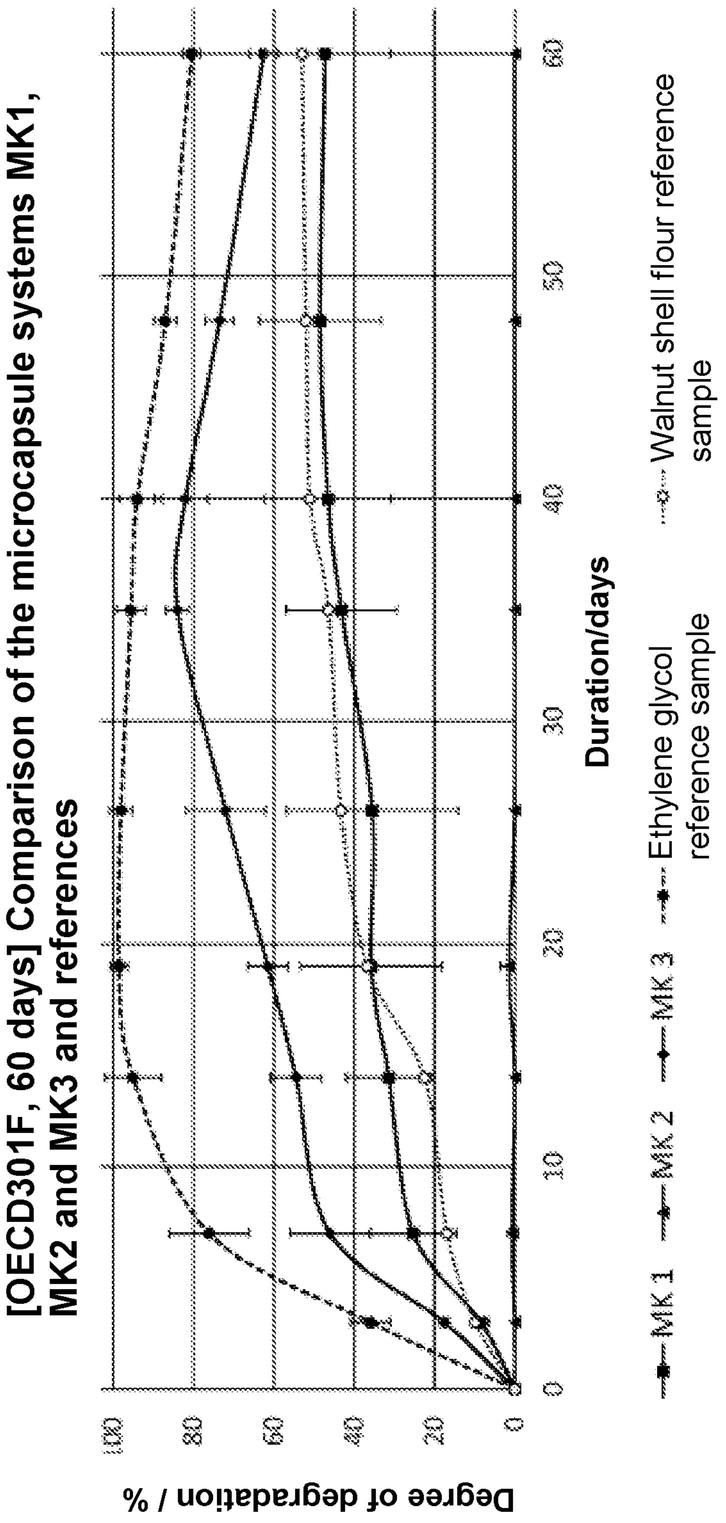
FIG. 7 is a diagram of the course of biological degradation according to OECD 301 F over 60 days after washing the microcapsule MK 1 over time and the MF reference microcapsule MK 2 and the gelatin/alginate reference microcapsule MK 3. As a positive control, both the breakdown of ethylene glycol is shown in the form of a dashed line and the breakdown of walnut shell flour in the form of a dotted line.

After washing, the capsule MK 1 shows a biodegradability of 47±16% after 60 days. A comparison of the biodegradability measurement according to OECD 301 F is shown in FIG. 7. This shows that the microcapsule MK 1 has a comparable biodegradability to the nature-based reference walnut shell flour with a biodegradability of 53% after 60 days.

Figure 5:
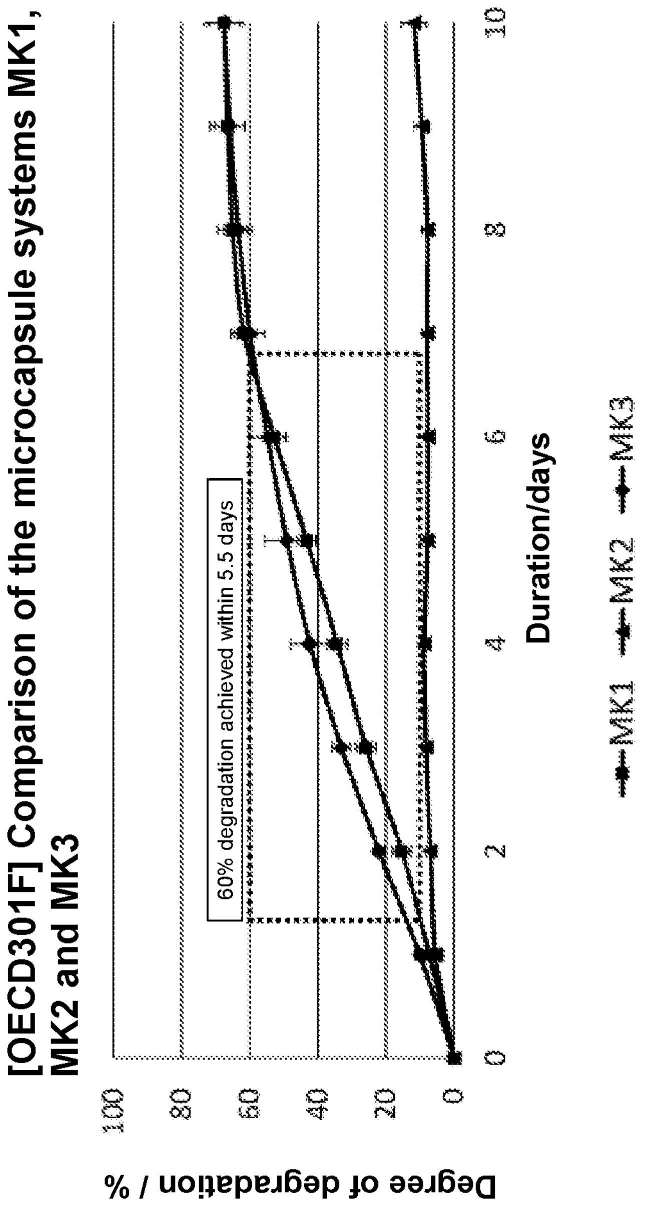
FIG. 5 is a comparison of the course of biological degradation over 28 days of the microcapsule MK 1 used, the MF reference microcapsule MK 2 and the gelatin/alginate reference microcapsule MK 3. A measurement according to OECD 301 F for the first 10 days of biological degradation is shown. Furthermore, the time window is shown in which the microcapsule MK 1 reaches a degree of degradation of 60%.

FIG. 5 shows a comparison of the biodegradability measurements according to OECD 301 F between the microcapsule MK 1, the MF reference microcapsule MK 2 and the gelatin/alginate reference microcapsule MK 3. The specification for the OECD 301 F (according to "Revised Introduction to the OECD Guidelines for testing of Chemicals, Section 3, Part 1, dated 23 Mar. 2006") provides that the substance to be tested must be tested within a 10-day time window (starting from degradation of 10%) must reach a degree of biological degradation of 60%. Both the microcapsule MK 1 and the gelatin/alginate reference microcapsule MK 3 show very rapid biological degradation compared to the MF reference microcapsule MK 2. The required period of time for a degradation of 60% is already reached after 7 days.

It is shown that the degree of degradation of the standard MF capsules MK 2, based on experience, reaches the range of 10% within a short time and forms a plateau here that indicates no further degradation within the measurement time.

Experience has shown that the cross-linked gelatin-alginate microcapsules MK 3 have good biodegradability. They reach the value of 68±5% within 10 days.

The microcapsule MK 1 also shows a degree of degradation of 68±6% after 10 days.

In FIG. 7, the degradation curves of MK 1, MK 2, MK 3 and the reference substances ethylene glycol and walnut shell flour are shown in comparison. It is shown that the rapidly biodegradable reference sample ethylene glycol reaches the maximum degradability between the 15th day and the 25th day of measurement. Thereafter, the measurement value appears to drop, caused by processes in the inoculum caused by the absence of a degradable food source. This effect can be evaluated as a measurement artifact. A comparable behavior can be seen for the easily degradable reference microcapsules MK 3. The maximum degradability of sample MK 3 is reached between the 25th day and the 45th day of the measurement and drops subsequently. The poorly degradable reference MK 2 does not show any biodegradability in the course of the measurement. Negative measurement values (which occurred particularly in the second half of the measurement period) were set to zero. The nature-based reference walnut shell flour shows the typical gradual degradation of a complex mixture of substances. The maximum of biodegradability is reached in the range of the 40th day of the measurement, whereby this value remains constant within the fluctuation range until the end of the measurement after 60 days. A similar degradation behavior can be observed for the microcapsule MK 1. After 60 days, a mean degree of degradation of 47% is reached over a gradual progression, wherein the absolute spread width is between 30 and 65% biodegradability.

TABLE 10

Presentation of the degradation values according to OECD 301 (60 days)

| | Method | 7 days | 14 days | 26 days | 40 days | 48 days | 60 days |
|---|---|---|---|---|---|---|---|
| Capsule (MK 1), washed[1)] | OECD 301 F | 25 ± 11 | 31 ± 10 | 36 ± 21 | 47 ± 16 | 49 ± 15 | 47 ± 16 |
| Melamine formaldehyde capsules (MK 2), washed[2)] | OECD 301 F | 1 ± 1 | 0 ± 0 | 0 ± 0 | 0 ± 0 | 0 ± 0 | 0 ± 0 |
| Gelatin alginate capsules (MK 3), washed[3)] | OECD 301 F | 46 ± 10 | 55 ± 6 | 72 ± 10 | 82 ± 6 | 74 ± 4 | 63 ± 4 |
| Walnut shell flour[4)] | OECD 301 F | 17 | 23 | 43 | 51 | 52 | 53 |

[1)]MK 1, quadruple determination
[2)]MK 2, double determination
[3)]MK 3, double determination
[4)]Walnut shell flour reference, single determination

Example 7—Biodegradability Measurement of the Microcapsules (According to OECD 302 C)

7.1 General

This test is used to assess the basic biodegradability of the microcapsules.

The measurement was carried out using the specifications of OECD302C 1981-05 by a test laboratory accredited according to DIN EN ISO 17025 (SGS Institut Fresenius GmbH, Taunusstein, Germany). The modified test procedure with natural inoculum and modified detection method (direct quantification of the carbon dioxide formed) was used.

Microcapsule slurries containing perfluorooctane (degradation rate=<1%) as the core material were produced analogously to the sample preparation for the biodegradability measurement according to OECD 301 F (see example 5). Thus, an influence of the core material on the biodegradability of the microcapsules is prevented.

7.2 Equipment and Chemicals

According to the information provided by the testing laboratory, the inoculum used consists of activated sludge from the Taunusstein-Bleidenstadt wastewater treatment plant (~100 mg dry matter equivalent/L sample). Aniline was used as a control.

7.3 Procedure

First, a sample was taken from the respective microcapsule slurries and an analysis of the total organic carbon (TOC) was carried out. Knowing the molar ratio of carbon dioxide to elemental carbon, the theoretical amount of carbon dioxide that can be released when the test substance breaks down ($TCO_2$, "theoretical amount of $CO_2$") can be calculated using the TOC.

The test samples were prepared in a volume of 3500 mL each. The test object and the inoculum were incubated in this volume at room temperature in a mineral nutrient medium. By knowing the TOC of the microcapsule slurry, a carbon concentration of about 25 mg C/L was set. Thus, only the carbon from the test object was available as an energy source for the microorganisms in the inoculum. The test samples were aerated with $CO_2$-free compressed air and stirred with a magnetic stirrer. The carbon contained in the test object was converted into carbon dioxide by the degradation of the test object by microorganisms. This gas development was collected using gas wash bottles mounted on the test sample. The gas wash bottles were filled with a solution of barium hydroxide, which binds the carbon dioxide that forms. The carbon dioxide formed in the test sample can be quantified by titration with hydrochloric acid. The degree of degradation of the test substance was then calculated by comparing the theoretically formable carbon dioxide (from the TOC measurement) with the actually determined amount of carbon dioxide. Three samples were prepared for each test substance, which enables the determination of an average degree of degradation.

To determine the amount of carbon dioxide produced by the inoculum, two so-called blank samples, which contained no test substance but only the inoculum, were determined in parallel with the test sample. The amount of carbon dioxide determined in this way was subtracted from the test sample. Analogously to the procedure described, a sample with a control object (aniline) and a sample with a mixture of the test object and the control object (toxicity control) were also prepared and carried along.

The test lasted 28 or 60 days, wherein the degradation test was stopped on the last day by adding conc. hydrochloric acid and the carbonates or dissolved carbon dioxide in the sample were expelled and also quantified in the connected gas washing bottles.

7.4 Measurement and Evaluation

After the barium hydroxide solution in the gas washing bottles has been titrated, the amount of carbon dioxide produced in the test sample can be quantified and the degree of degradation of the test substance can be calculated using the following formula:

$$\% \text{ degradation} = \frac{\text{mg CO2 produced} * 100}{(\text{test substance in the sample}) * T\,\text{CO2}}$$

7.5 Result

TABLE 11

Presentation of the degradation values according to OECD 301 F and OCED 302 C (28 days)

| | Method | 3 days | 7 days | 10 days | 14 days | 21 days | 28 days |
|---|---|---|---|---|---|---|---|
| Capsule (MK 1) | OECD 301 F | 22 ± 5 | 61 ± 5 | 68 ± 6 | 70 ± 7 | 73 ± 8 | 76 ± 4 |
| | OECD 302 C | 16 ± 1 | 22 ± 1 | 31 ± 1 | 37 ± 3 | 39 ± 4 | 45 ± 4 |
| Capsule (MK 1a) | OECD 301 F | 23 ± 6 | 64 ± 8 | 69 ± 5 | 72 ± 7 | 74 ± 9 | 78 ± 8 |
| Melamine formaldehyde capsules (MK 2) | OECD 301 F | 8 ± 1 | 8 ± 1 | 12 ± 4 | — | — | — |
| Gelatin alginate capsules (MK 3) | OECD 301 F | 33 ± 3 | 60 ± 5 | 68 ± 5 | — | — | — |

The biodegradation diagram according to OECD 302 C of the capsule MK 1 is shown in FIG. 4(*b*).

The capsules MK 1 show a degradability value of 45±4% after 28 days.

Finally, it should be expressly pointed out that the above-described embodiments of the device only serve to explain the claimed teaching, but do not restrict it to the embodiments.

The invention claimed is:

1. A washing or cleaning agent comprising:

microcapsules each comprising a core and a shell, wherein:

the core comprises a core material, the core material comprises a fragrance, the shell comprises a first layer and a second layer having a chemical composition different from a chemical composition of the first layer, the shell has a biodegradability, measured in accordance with OECD 301 F, of at least 40%, the second layer comprises an aldehyde component, an amine component, and an aromatic alcohol selected from the group consisting of resorcinol, phloroglucinol, and aminophenol, the aldehyde component is present in an amount of from 5.0 to 50 wt. %, based on the total weight of the second layer, the amine component is present in an amount of from 20 to 85 wt. %, based on the total weight of the second layer, and the aromatic alcohol is present in an amount of from 5.0 to 15 wt. %, based on the total weight of the second layer; and a further ingredient selected from the group consisting of a surfactant, an enzyme, a builder, an agent that enhances absorption, and any mixture thereof.

2. The washing or cleaning agent of claim 1, wherein the shell has a biodegradability, measured according to OECD 301 F, of at least 50%.

3. The washing or cleaning agent of claim 2, wherein the shell has a biodegradability, measured in accordance with OECD 301 F, of at least 70%.

4. The washing or cleaning agent of claim 1, wherein each microcapsule has a tightness that ensures an escape of at most 80 wt. % of the core material after storage for a period of 12 weeks at a temperature of from 0 to 40° C.

5. The washing or cleaning agent of claim 1, wherein the first layer comprises a biodegradable component selected from the group consisting of a protein, a polysaccharide, a phenolic macromolecule, a polyglucosamine, a polyvinyl ester, a phosphazene, a polyester, and any mixture thereof.

6. The washing or cleaning agent of claim 1, wherein the first layer comprises an inorganic component.

7. The washing or cleaning agent of claim 6, wherein the inorganic component is selected from the group consisting of calcium carbonate, a polysilicate, and any mixture thereof.

8. The washing or cleaning agent of claim 1, wherein the second layer further comprises at least one of an acrylate component or an isocyanate component.

9. The washing or cleaning agent of claim 1, wherein the aldehyde component is selected from the group consisting of formaldehyde, glutaraldehyde, succinaldehyde, furfural, glyoxal, and any mixture thereof.

10. The washing or cleaning agent of claim 9, wherein the aldehyde component is present in an amount of from 15 to 20 wt. %, based on the total weight of the second layer.

11. The washing or cleaning agent of claim 1, wherein the amine component is selected from the group consisting of melamine, a melamine derivative, urea, and any combination thereof.

12. The washing or cleaning agent of claim 11, wherein the amine component is present in an amount of from 55 to 70 wt. %, based on the total weight of the second layer.

13. The washing or cleaning agent of claim 1, wherein the second layer is arranged on the inside of the first layer.

14. The washing or cleaning agent of claim 1, wherein the second layer is present in an amount of at most 30 wt. %, based on the total weight of the shell.

15. The washing or cleaning agent of claim 1, wherein the second layer has an average thickness of from 0.01 μm to 1 μm.

16. The washing or cleaning agent of claim 15, wherein the second layer has an average thickness of from 0.05 μm to 0.30 μm.

17. The washing or cleaning agent of claim 1, wherein:

each microcapsule comprises a third layer on the outside of the first layer, and the third layer comprises one or more components selected from the group consisting of an amine, an organic salt, an inorganic salt, an alcohol, an ether, a polyphosphazene, a precious metal, and any mixture thereof.

18. The washing or cleaning agent of claim 1, wherein the aromatic alcohol is present in an amount of from 9 to 13 wt. %, based on the total weight of the second layer.

19. A method of cleaning a textile or a hard surface, the method comprising applying the washing or cleaning agent of claim 1 to the textile or the hard surface.

* * * * *